US012665797B2

(12) United States Patent
Jiang et al.

(10) Patent No.: US 12,665,797 B2
(45) Date of Patent: Jun. 23, 2026

(54) METHOD AND APPARATUS FOR TRANSMITTING UPLINK TRANSMISSION AND SYSTEM

(71) Applicant: 1FINITY Inc., Kawasaki (JP)

(72) Inventors: Qinyan Jiang, Beijing (CN); Tsuyoshi Shimomura, Yokohama (JP); Zhe Chen, Beijing (CN); Lei Zhang, Beijing (CN)

(73) Assignee: 1FINITY Inc., Kawasaki (JP)

( * ) Notice: Subject to any disclaimer, the term of this patent is extended or adjusted under 35 U.S.C. 154(b) by 392 days.

(21) Appl. No.: 17/731,367

(22) Filed: Apr. 28, 2022

(65) Prior Publication Data

US 2022/0255782 A1     Aug. 11, 2022

Related U.S. Application Data

(63) Continuation of application No. PCT/CN2019/116426, filed on Nov. 7, 2019.

(51) Int. Cl.
  *H04L 27/26* (2006.01)
  *H04W 72/04* (2023.01)
  *H04W 74/04* (2009.01)

(52) U.S. Cl.
  CPC ......... *H04L 27/2607* (2013.01); *H04W 72/04* (2013.01); *H04W 74/04* (2013.01)

(58) Field of Classification Search
  CPC . H04L 27/2607; H04L 5/0032; H04L 5/0062; H04L 27/0006; H04L 27/2646; H04L 5/00; H04W 72/04; H04W 74/04; H04W 72/0446; H04W 56/00; H04J 3/06
  See application file for complete search history.

(56) References Cited

U.S. PATENT DOCUMENTS

| | | | |
|---|---|---|---|
| 2009/0201951 A1 | 8/2009 | Ahn et al. | |
| 2009/0245222 A1 | 10/2009 | Sampath et al. | |
| 2011/0044188 A1 | 2/2011 | Luo et al. | |
| 2014/0016620 A1* | 1/2014 | Singh ................... | H04L 5/0032 370/336 |

(Continued)

FOREIGN PATENT DOCUMENTS

| | | |
|---|---|---|
| CN | 101882942 A | 11/2010 |
| CN | 101971586 A | 2/2011 |

(Continued)

OTHER PUBLICATIONS

First Notification of Office Action and Search Report issued by the China National Intellectual Property Administration for corresponding Chinese Patent Application No. 201980101732.0, mailed on Jun. 21, 2023, with an English translation.

(Continued)

*Primary Examiner* — Omer S Mian
(74) *Attorney, Agent, or Firm* — Myers Wolin, LLC

(57) ABSTRACT

An apparatus for transmitting uplink transmission, configured in a terminal equipment, includes a receiver configured to receive second indication information, the second indication information being used to indicate a duration of a CP extension corresponding to a second uplink transmission, and processor circuitry configured to transmit the second uplink transmission without transmitting the CP extension.

15 Claims, 12 Drawing Sheets

(56) References Cited

U.S. PATENT DOCUMENTS

| | | | | |
|---|---|---|---|---|
| 2015/0365218 A1* | 12/2015 | Yang | .................... | H04L 5/0051 |
| | | | | 370/329 |
| 2017/0215198 A1 | 7/2017 | Chen et al. | | |
| 2021/0226756 A1 | 7/2021 | Zhu | | |
| 2022/0225258 A1* | 7/2022 | Ratasuk | ............ | H04W 56/0045 |
| 2023/0328781 A1* | 10/2023 | Wang | .................... | H04L 5/0048 |
| | | | | 370/329 |

FOREIGN PATENT DOCUMENTS

| | | |
|---|---|---|
| CN | 103281284 A | 9/2013 |
| CN | 108496320 A | 9/2018 |
| CN | 108886788 A | 11/2018 |
| CN | 110351851 A | 10/2019 |
| EP | 2 429 090 A1 | 3/2012 |
| JP | 2011-508483 A | 3/2011 |

OTHER PUBLICATIONS

Second Notification of Office Action and Search Report issued by the China National Intellectual Property Administration for corresponding Chinese Patent Application No. 201980101732.0, mailed on Feb. 20, 2024, with an English translation.

International Search Report and Written Opinion of the International Searching Authority issued by the China National Intellectual Property Administration for corresponding International Patent Application No. PCT/CN2019/116426, mailed on Aug. 12, 2020, with an English translation.

Huawei et al., "Resource allocation and indication for data channel", Agenda Item: 8.1.3.3.1, 3GPP TSG RAN WG1 Meeting #88bis, R1-1705069, Spokane, USA, Apr. 3-7, 2017.

Notice of Reasons for Refusal issued by the Japan Patent Office for corresponding Japanese Patent Application No. 2022-525173, mailed on Jun. 13, 2023, with an English translation.

Vivo, "Discussion on the channel access procedures", Agenda Item: 7.2.2.2.1, 3GPP TSG-RAN WG1 Meeting #98bis, R1-1910204, Chongqing, China, Oct. 14-20, 2019.

Qualcomm Incorporated, "Summary of RRC parameters for NR-U up to RAN1", Agenda Item: 7.2.2, 3GPP TSG-RAN WG1 Meeting #99, R1-1911722, Reno, USA, Nov. 18-22, 2019.

LG Electronics, "Channel access procedure for NR-U", Agenda Item: 7.2.2.2.1, 3GPP TSG-RAN WG1 Meeting #98bis, R1-1910819, Chongqing, China, Oct. 14-20, 2019.

* cited by examiner

|←————————————frame k, sub-frame x, slot i————————————→|

······| #7 | #8 | #9 |#10|#11|#12|#13| #0 | #1 | #2 | #3 | #4 | #5 | #6 | #7 | #8 | #9 |#10|#11|#12|#13| #0 | #1 | #2 | #3 | #4 | #5 | #6 |······

↑
a symbol

FIG. 7

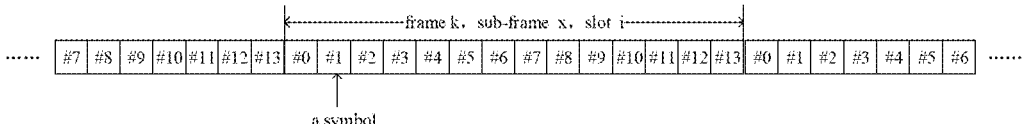

801 a terminal equipment receives second indication information, the second indication information being used to indicate a duration of a second signal corresponding to a second uplink transmission

802 the terminal equipment adjusts the duration of the second signal corresponding to the second uplink transmission and transmits the adjusted second uplink transmission

FIG. 8

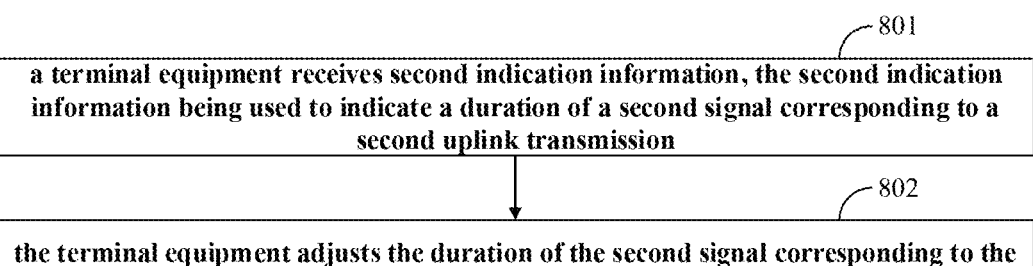

corresponding to firstUL transmission

| second signal | first signal | corresponding to second UL transmission

| second signal | first signal |

FIG. 9

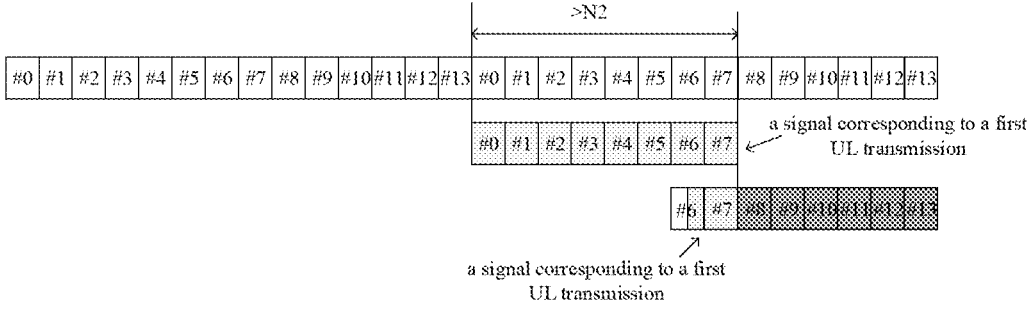

FIG. 18

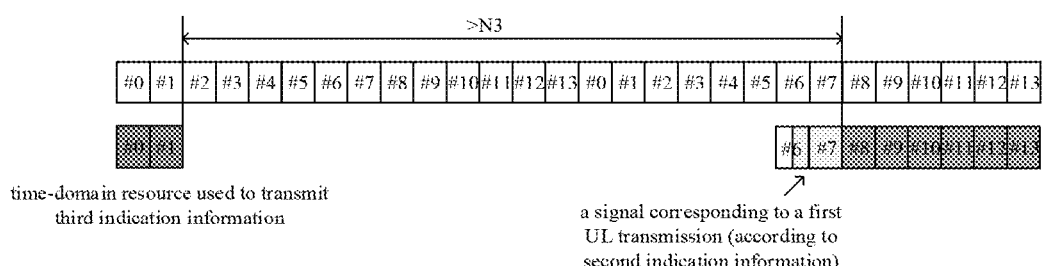

FIG. 19

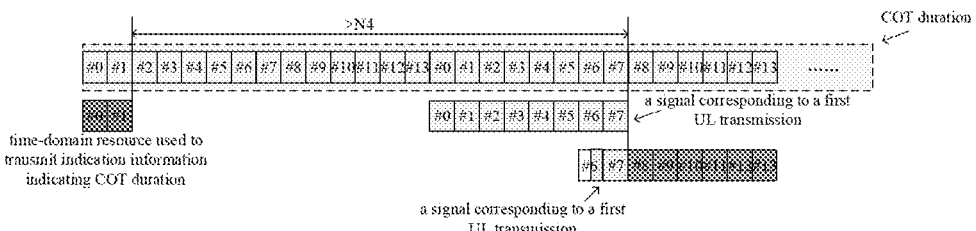

FIG. 20

2101 a terminal equipment receives second indication information, the second indication information being used to indicate a duration of a second signal corresponding to a second uplink transmission

2102 the terminal equipment transmits a first uplink transmission or transmits the second uplink transmission, a signal corresponding to the first uplink transmission overlapping the second signal corresponding to the second uplink transmission

FIG. 21

METHOD AND APPARATUS FOR TRANSMITTING UPLINK TRANSMISSION AND SYSTEM

CROSS-REFERENCE TO RELATED APPLICATION

This application is a continuation application of International Application PCT/CN2019/116426 filed on Nov. 7, 2019 and designated the U.S., the entire contents of which are incorporated herein by reference.

FIELD

This disclosure relates to the field of communications.

BACKGROUND

Unlicensed frequency bands are important components of spectrum resources, and there are already many systems supporting data transmission on unlicensed frequency bands, such as WiFi, long term evolution (LTE) license assisted access (LAA), etc. However, New Radio (NR) systems do not support unlicensed frequency bands at present.

On the other hand, systems deployed at unlicensed frequency bands need to meet the regulatory requirements of the corresponding frequency bands in regions where they are located. For example, in order to use spectrum resources fairly and efficiently among different systems or devices, a device needs to determine that resources are available before starting to transmit data, and then transmit the data. For another example, if a device needs to share a channel occupied by another device in the system, a gap between two transmissions needs to be small enough.

It should be noted that the above description of the background art is merely provided for clear and complete explanation of this disclosure and for easy understanding by those skilled in the art. And it should not be understood that the above technical solution is known to those skilled in the art as it is described in the background art of this disclosure.

SUMMARY OF THE DISCLOSURE

It was found by the inventors that in some cases, a terminal equipment needs to transmit uplink transmission according to whether two uplink transmissions overlap. However, in NR, the uplink transmission only corresponds to a first signal, hence, the terminal equipment only needs to transmit the uplink transmission according to whether the first signal overlap. However, in NR-U, which means NR-based unlicensed spectrum (or, shared spectrum) access, also referred to as NR radio access operating in unlicensed spectrum, in order to meet regulatory requirements of corresponding spectrum in some regions, in addition to the first signal, uplink transmission may possibly also correspond to a second signal. As shown in FIG. 1, the second signal is used to extend the duration of the uplink transmission, or to adjust a starting position of the uplink transmission. Therefore, unlike NR, the two uplink transmissions in NR-U may possibly overlap due to the second signal. However, there is currently no way to support how to transmit uplink transmissions in such a case.

In order to solve the above problems or other similar problems, embodiments of this disclosure provide a method and apparatus for transmitting uplink transmission and a communication system.

According to an aspect of the embodiments of this disclosure, there is provided a method for transmitting uplink transmission, including:

a terminal equipment receives second indication information, the second indication information being used to indicate a duration of a second signal corresponding to a second uplink transmission; and the terminal equipment adjusts the duration of the second signal corresponding to the second uplink transmission and transmits the adjusted second uplink transmission.

According to another aspect of the embodiments of this disclosure, there is provided a method for transmitting uplink transmission, including:

a terminal equipment receives second indication information, the second indication information being used to indicate a duration of a second signal corresponding to a second uplink transmission; and the terminal equipment transmits first uplink transmission or transmits the second uplink transmission, a signal corresponding to the first uplink transmission overlapping the second signal corresponding to the second uplink transmission.

According to an aspect of the embodiments of this disclosure, there is provided a method for receiving uplink transmission, including:

a network device transmits second indication information, the second indication information being used to indicate a duration of a second signal corresponding to a second uplink transmission of a terminal equipment, the terminal equipment adjusting the duration of the second signal corresponding to the second uplink transmission and transmitting the adjusted second uplink transmission; and the network device receives the second uplink transmission.

According to another aspect of the embodiments of this disclosure, there is provided a method for receiving uplink transmission, including:

a network device transmits second indication information, the second indication information being used to indicate a duration of a second signal corresponding to a second uplink transmission of a terminal equipment, the terminal equipment transmitting first uplink transmission or the second uplink transmission, a signal corresponding to the first uplink transmission overlapping the second signal corresponding to the second uplink transmission; and the network device receives the first uplink transmission or the second uplink transmission.

According to an aspect of the embodiments of this disclosure, there is provided an apparatus for transmitting uplink transmission, configured in a terminal equipment, the apparatus including:

a receiving unit configured to receive second indication information, the second indication information being used to indicate a duration of a second signal corresponding to a second uplink transmission; and a processing unit configured to adjust the duration of the second signal corresponding to the second uplink transmission and transmit the adjusted second uplink transmission.

According to another aspect of the embodiments of this disclosure, there is provided an apparatus for transmitting uplink transmission, configured in a terminal equipment, the apparatus including:

a receiving unit configured to receive second indication information, the second indication information being used to indicate a duration of a second signal corresponding to a second uplink transmission; and a transmitting unit configured to transmit first uplink transmission or transmit the second uplink transmission, a signal corresponding to the first uplink transmission overlapping the second signal corresponding to the second uplink transmission.

According to an aspect of the embodiments of this disclosure, there is provided an apparatus for receiving uplink transmission, configured in a network device, the apparatus including:

a transmitting unit configured to transmit second indication information, the second indication information being used to indicate a duration of a second signal corresponding to a second uplink transmission of a terminal equipment, the terminal equipment adjusting the duration of the second signal corresponding to the second uplink transmission and transmitting the adjusted second uplink transmission; and a receiving unit configured to receive the second uplink transmission.

According to another aspect of the embodiments of this disclosure, there is provided an apparatus for receiving uplink transmission, configured in a network device, the apparatus including:

a transmitting unit configured to transmit second indication information, the second indication information being used to indicate a duration of a second signal corresponding to a second uplink transmission of a terminal equipment, the terminal equipment transmitting first uplink transmission or the second uplink transmission, a signal corresponding to the first uplink transmission overlapping the second signal corresponding to the second uplink transmission; and a receiving unit configured to receive the first uplink transmission or the second uplink transmission.

According to an aspect of the embodiments of this disclosure, there is provided a terminal equipment, including the above apparatuses for transmitting uplink transmission.

According to an aspect of the embodiments of this disclosure, there is provided a network device, including the above apparatuses for receiving uplink transmission.

According to an aspect of the embodiments of this disclosure, there is provided a communication system, including the above network device and the above terminal equipment.

According to other aspects of the embodiments of this disclosure, there is provided a computer readable program, which, when executed in a terminal equipment, will cause a computer to carry out the methods for transmitting uplink transmission described above in the terminal equipment.

According to other aspects of the embodiments of this disclosure, there is provided a storage medium storing a computer readable program, which will cause a computer to carry out the methods for transmitting uplink transmission described above in a terminal equipment.

According to other aspects of the embodiments of this disclosure, there is provided a computer readable program, which, when executed in a network device, will cause a computer to carry out the methods for receiving uplink transmission described above in the network device.

According to a further aspect of the embodiments of this disclosure, there is provided a storage medium storing a computer readable program, which will cause a computer to carry out the methods for receiving uplink transmission described above in a network device.

One of the advantages of the embodiments of this disclosure exists in that according to at least one aspect of the embodiments of this disclosure, the reliability of uplink transmission may be improved and the latency of uplink transmission may be lowered, thereby obtaining higher transmission efficiency.

With reference to the following description and drawings, the particular embodiments of this disclosure are disclosed in detail, and the principle of this disclosure and the manners of use are indicated. It should be understood that the scope of the embodiments of this disclosure is not limited thereto. The embodiments of this disclosure contain many alternations, modifications and equivalents within the scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprises/comprising/includes/including" when used in this specification is taken to specify the presence of stated features, integers, steps or components but does not preclude the presence or addition of one or more other features, integers, steps, components or groups thereof.

BRIEF DESCRIPTION OF THE DRAWINGS

Elements and features depicted in one drawing or embodiment of the disclosure may be combined with elements and features depicted in one or more additional drawings or embodiments. Moreover, in the drawings, like reference numerals designate corresponding parts throughout the several views and may be used to designate like or similar parts in more than one embodiments.

The drawings are included to provide further understanding of this disclosure, which constitute a part of the specification and illustrate the exemplify embodiments of this disclosure, and are used for setting forth the principles of this disclosure together with the description. It is obvious that the accompanying drawings in the following description are some embodiments of this disclosure, and for those of ordinary skills in the art, other accompanying drawings may be obtained according to these accompanying drawings without making an inventive effort. In the drawings:

FIG. 7 is a schematic diagram of a relationship between a slot and a symbol;

FIG. 8 is a schematic diagram of the method for transmitting uplink transmission of a first aspect of embodiments;

FIG. 9 is a schematic diagram of overlapping between a second signal corresponding to a second uplink transmission and a signal corresponding to a first uplink transmission;

FIG. 16 is a schematic diagram of not adjusting the duration of the second signal corresponding to the second uplink transmission in a case where the first uplink transmission is not transmitted;

FIG. 17 to FIG. 20 are schematic diagrams of comparison between a time gap and a threshold;

FIG. 21 is another schematic diagram of the method for transmitting uplink transmission of the first aspect of embodiments;

DETAILED DESCRIPTION

Figure 1:
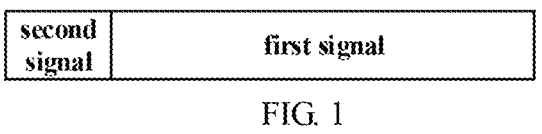
FIG. 1 to FIG. 5 are schematic diagrams of five examples of uplink transmission.

These and further aspects and features of this disclosure will be apparent with reference to the following description and attached drawings. In the description and drawings, particular embodiments of the disclosure have been disclosed in detail as being indicative of some of the ways in which the principles of the disclosure may be employed, but it is understood that the disclosure is not limited correspondingly in scope. Rather, the disclosure includes all changes, modifications and equivalents coming within the terms of the appended claims.

In the embodiments of this disclosure, terms "first", and "second", etc., are used to differentiate different elements with respect to names, and do not indicate spatial arrangement or temporal orders of these elements, and these elements should not be limited by these terms. Terms "and/or" include any one and all combinations of one or more relevantly listed terms. Terms "contain", "include" and "have" refer to existence of stated features, elements, components, or assemblies, but do not exclude existence or addition of one or more other features, elements, components, or assemblies.

In the embodiments of this disclosure, single forms "a", and "the", etc., include plural forms, and should be understood as "a kind of" or "a type of" in a broad sense, but should not defined as a meaning of "one"; and the term "the"

should be understood as including both a single form and a plural form, except specified otherwise. Furthermore, the term "according to" should be understood as "at least partially according to", the term "based on" should be understood as "at least partially based on", except specified otherwise.

In the embodiments of this disclosure, the term "communication network" or "wireless communication network" may refer to a network satisfying any one of the following communication standards: long term evolution (LTE), long term evolution-advanced (LTE-A), wideband code division multiple access (WCDMA), and high-speed packet access (HSPA), etc.

And communication between devices in a communication system may be performed according to communication protocols at any stage, which may, for example, include but not limited to the following communication protocols: 1G (generation), 2G, 2.5G, 2.75G, 3G, 4G, 4.5G, and 5G and new radio (NR) in the future, etc., and/or other communication protocols that are currently known or will be developed in the future.

In the embodiments of this disclosure, the term "network device", for example, refers to a device in a communication system that accesses a user equipment to the communication network and provides services for the user equipment. The network device may include but not limited to the following equipment: a base station (BS), an access point (AP), a transmission reception point (TRP), a broadcast transmitter, a mobile management entity (MME), a gateway, a server, a radio network controller (RNC), a base station controller (BSC), etc.

The base station may include but not limited to a node B (NodeB or NB), an evolved node B (eNodeB or eNB), and a 5G base station (gNB), etc. Furthermore, it may include a remote radio head (RRH), a remote radio unit (RRU), a relay, or a low-power node (such as a femto, and a pico, etc.). The term "base station" may include some or all of its functions, and each base station may provide communication coverage for a specific geographical area. And a term "cell" may refer to a base station and/or its coverage area, which may be expressed as a serving cell, and may be a macro cell or a pico cell, depending on a context of the term.

In the embodiments of this disclosure, the term "user equipment (UE)" refers to, for example, an equipment accessing to a communication network and receiving network services via a network device, and may also be referred to as "a terminal equipment (TE)". The terminal equipment may be fixed or mobile, and may also be referred to as a mobile station (MS), a terminal, a subscriber station (SS), an access terminal (AT), or a station, etc.

The terminal equipment may include but not limited to the following devices: a cellular phone, a personal digital assistant (PDA), a wireless modem, a wireless communication device, a hand-held device, a machine-type communication device, a lap-top, a cordless telephone, a smart cell phone, a smart watch, and a digital camera, etc.

For another example, in a scenario of the Internet of Things (IoT), etc., the user equipment may also be a machine or a device performing monitoring or measurement. For example, it may include but not limited to a machine-type communication (MTC) terminal, a vehicle mounted communication terminal, a device to device (D2D) terminal, and a machine to machine (M2M) terminal, etc.

For the convenience of description, a correspondence relationship between uplink transmission, a signal and a time-domain resource involved in the embodiments of this disclosure shall be described below.

In the embodiments of this disclosure, the uplink transmission may be a PUSCH (uplink shared channel), a PUCCH (uplink control channel), a PRACH (random access channel), and an SRS (sounding reference signal), etc., and the uplink transmission may be semi-statically configured, semi-persistently scheduled, or dynamically scheduled.

Figure 2:
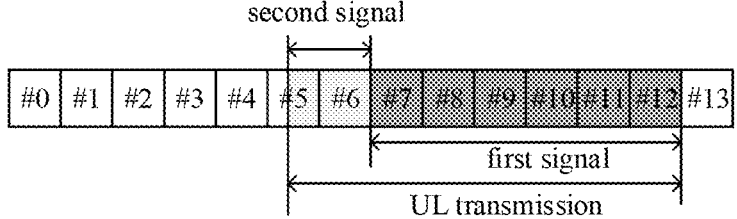
Figure 3:
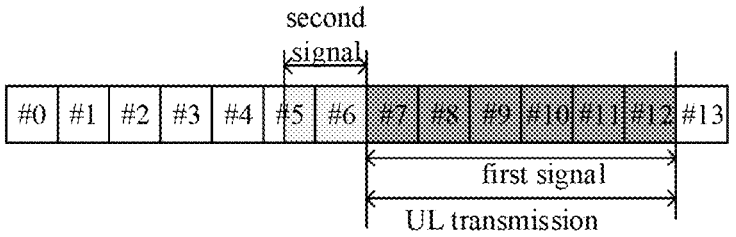

In the embodiments of this disclosure, uplink transmission may correspond to two parts of a signal, and a correspondence relationship therebetween may be as shown in FIG. 2 or as shown in FIG. 3. In the example of FIG. 2, the uplink transmission includes a first signal and also includes a second signal; wherein the second signal is before the first signal, and the second signal and the first signal are consecutive. In the example of FIG. 3, the uplink transmission includes a first signal, a second signal is before the uplink transmission, and the second signal and the first signal are consecutive. That is, a difference between the examples in FIG. 2 and FIG. 3 is that regarding description, the second signal is deemed as a part of the uplink transmission in the example in FIG. 2, and the second signal is not deemed as a part of the uplink transmission in the example in FIG. 3.

Figure 4:
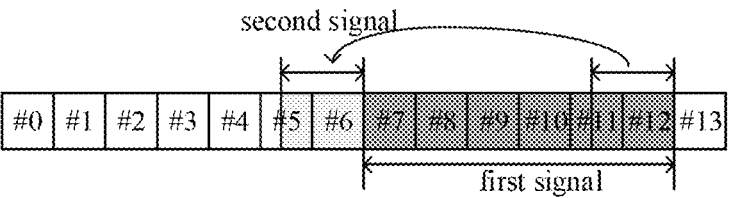

Furthermore, in the examples of FIG. 2 and FIG. 3, the second signal is used to extend the duration corresponding to the uplink transmission, or is used to adjust a starting position of the uplink transmission. For example, as shown in FIG. 4, the second signal is CP extension (cyclic prefix extension) of the uplink transmission. Therefore, on the one hand, in some cases, the terminal equipment may be made to meet regulatory requirements on unlicensed spectrum in transmitting the uplink transmission; and on the other hand, in some cases, the network device may control priorities of transmitting uplink transmissions between terminal equipments by controlling the duration of the second signal.

Figure 5:
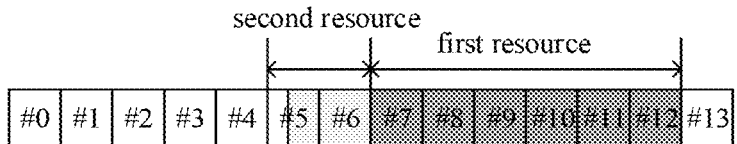

In the embodiments of this disclosure, assuming that the uplink transmission corresponds to a first time-domain resource. Accordingly, the first signal corresponds to a first resource of the first time-domain resource, and the second signal corresponds to a second resource of the first time-domain resource. A time length of the second resource is greater than or equal to a duration of the second signal, as shown in FIG. 5.

Figure 6:
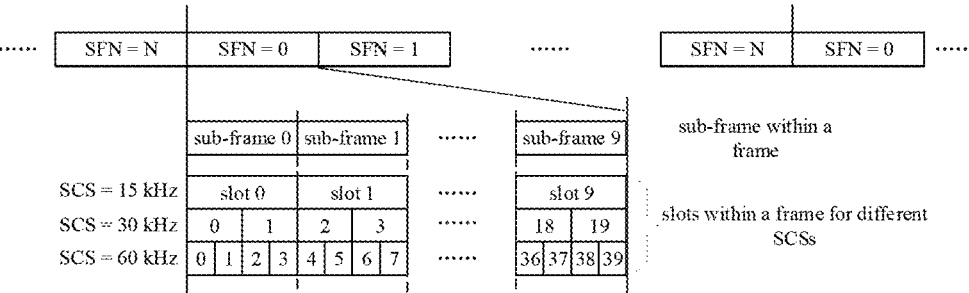
FIG. 6 is a schematic diagram of a relationship between a frame, a subframe and a slot.

FIG. 6 is a schematic diagram of a relationship between a frame, a subframe and a slot. As shown in FIG. 6, a frame being an SFN (super frame) is taken as an example, and each frame includes multiple subframes. Depending on different carrier spacings (SCSs), each subframe includes one or more than one slot.

FIG. 7 is a schematic diagram of a relationship between a slot and a symbol. As shown in FIG. 7, each slot includes 14 symbols.

In the embodiments of this disclosure, considering a time-domain position relationship between two uplink transmissions of the same device (or a time-domain position relationship between signals or time-domain resources corresponding to the two uplink transmissions), if a signal corresponding to the first uplink transmission overlaps a second signal corresponding to the second uplink transmission, or, if a gap between the first uplink transmission and the second uplink transmission is less than a certain threshold, one of the uplink transmissions may be selected for transmission, or a duration (length) of the second signal corresponding to the uplink transmission may be adjusted, and the adjusted duration of the second signal is used to transmit the uplink transmission.

Various implementations of the embodiments of this disclosure shall be described below with reference to the accompanying drawings. These implementations are illustrative only, and are not intended to limit this disclosure.

First Aspect of the Embodiments

The first aspect of the embodiments of this disclosure provides a method for transmitting uplink transmission, applicable to a terminal equipment, such as the UE described above.

FIG. 8 is a schematic diagram of the method for transmitting uplink transmission of the embodiment of this disclosure. As shown in FIG. 8, the method includes:

operation 801: a terminal equipment receives second indication information, the second indication information being used to indicate a duration of a second signal corresponding to a second uplink transmission; and operation 802: the terminal equipment adjusts the duration of the second signal corresponding to the second uplink transmission and transmits the adjusted second uplink transmission.

In the embodiment of FIG. 8, by adjusting the duration of the second signal corresponding to the second uplink transmission, the gap between signals corresponding to the two uplink transmissions may be made to be 0 or less than a threshold. After transmitting the former uplink transmission (referred to as first uplink transmission), the terminal equipment may continue to transmit the latter uplink transmission (second uplink transmission), thereby obtaining a higher transmission efficiency.

In the embodiment of this disclosure, the terminal equipment may further receive indication information (referred to as first indication information) used to indicate a first signal corresponding to the second uplink transmission, the first indication information, for example, indicating a first resource corresponding to the first signal. Reference may be made to related techniques for a particular indication method, which is not limited in this disclosure.

In the embodiment of this disclosure, the second indication information may directly indicate the duration of the second signal, or may indirectly indicate the duration of the second signal. Moreover, the second indication information may be carried by DCI (downlink control information), a MAC CE (medium access control control element), or broadcast/dedicated RRC (radio resource control) signaling, etc.

For example, for a PUSCH scheduled by the DCI, that is, the second uplink transmission is a PUSCH scheduled by the DCI, the second indication information may be carried by the DCI, such as DCI format 0_1 or DCI format 0_0; for a PUSCH scheduled by an RAR, the second indication information may be carried by the MAC CE, or may be carried by the DCI, such as DCI format 1_0. Table 1 is an example of the second indication information.

| Second indication information | Second signal (duration) |
| --- | --- |
| 00 | 0 (i.e. no CP extension) |
| 01 | C1*symbol length - 25 us |
| 10 | C2*symbol length - 16 us - TA |
| 11 | C3*symbol length - 25 us - TA |

In Table 1, Cn*symbol length (n=1 or 2 or 3) refers to durations of Cn symbols before a first resource corresponding to the first signal corresponding to the uplink transmission (e.g. the above second uplink transmission). If Cn>=2, time lengths corresponding to two symbols in the Cn symbols are identical or different. Values of C1, C2 and C3 are predefined or fixed, or implicitly determined by the terminal equipment according to TA (timing advance), or indicated by the network device, such as being directly indicated, or is determined implicitly by the terminal equipment according to the TA indicated by the network device. In addition, the values of C1, C2 and C3 may be related to the subcarrier spacing, that is, the values of C1, C2 and C3 corresponding to the two subcarrier spacings may be different.

For another example, for a CG PUSCH (Type 1 or Type 2), that is, the second uplink transmission is a CG PUSCH, the second indication information is, for example, RRC signaling, such as cg-StartingFullBW-InsideCOT-r16, and/or cg-StartingFullBW-OutsideCOT-r16, and/or cg-StartingPartialBW-InsideCOT-r16, and/or cg-StartingPartialBW-OutsideCOT-r16, in ConfiguredGrantConfig. Or, for a CG PUSCH (Type 2), the second indication information may also be carried by DCI, for example, the DCI is used to activate the CG PUSCH (Type 2).

Likewise, for a PUCCH, the second indication information may be carried by DCI or RRC signaling, the DCI, for example, is DCI format 1_0 or DCI format 1_1, and the RRC signaling is, for example, PUCCH-InsideCOT-r16, PUCCH-OutsideCOT-r16.

In the embodiment of this disclosure, if the second indication information indicates two or more durations, for example, it indicates a duration via cg-StartingPartialBW-InsideCOT-r16, and indicates a duration via cg-StartingPartialBW-OutsideCOT-r16, the terminal equipment needs to select one of the durations. For another example, the second indication information indicates two or more durations via cg-StartingFullBW-InsideCOT-r16 or via cg-StartingFullBW-OutsideCOT-r16, the terminal equipment may select one of the durations.

In the embodiment of this disclosure, in at least one embodiment, the second signal corresponding to the second uplink transmission overlap the signal corresponding to the first uplink transmission. That is, if the second signal corresponding to the second uplink transmission overlap the first uplink transmission, the terminal equipment adjusts the duration of the second signal corresponding to the second uplink transmission, and transmits the second uplink transmission according to the adjusted duration of the second signal. Optionally, in this embodiment, the first signal corresponding to the second uplink transmission and the signal corresponding to the first uplink transmission do not overlap, that is, only the second signal corresponding to the second uplink transmission overlap the signal corresponding to the first uplink transmission.

FIG. 9 is a schematic diagram of overlapping between the second signal corresponding to the second uplink transmission and the signal corresponding to the first uplink transmission. As shown in FIG. 9, the signal corresponding to the first uplink transmission (the first uplink transmission may only correspond to the first signal, and may also correspond to the first signal and the second signal) overlap the second signal corresponding to the second uplink transmission. According to the method of the embodiment of this disclosure, by adjusting the duration of the second signal corresponding to the second uplink transmission, the gap between signals corresponding to the two uplink transmissions may be made to be 0 or less than a threshold. Therefore, after transmitting the first uplink transmission, the terminal equipment may continue to transmit the second uplink transmission, thereby obtaining a higher transmission efficiency.

In the embodiment of this disclosure, the terminal equipment may adjust the duration of the second signal according to an indication of the network device and/or a predefined rule.

In at least one embodiment, for a case of the indication of the network device, the terminal equipment may receive third indication information before transmitting the second uplink transmission, the third indication information being used to indicate the duration of the second signal corresponding to the second uplink transmission, thus, the terminal equipment may transmit the second uplink transmission according to the duration of the second signal corresponding to the second uplink transmission indicated by the third indication information. The third indication information may directly indicate the duration of the second signal, or may indirectly indicate the duration of the second signal. In the embodiment of this disclosure, the third indication information may be after the second indication information, and the third indication information may be carried by physical layer signaling, such as DCI, e.g. DCI format 2_0.

In some embodiments, the terminal equipment receives the third indication information before a third predetermined number (N3) of symbols prior to a second reference symbol corresponding to the second uplink transmission (such as a first symbol corresponding to a first signal corresponding to the second uplink transmission, or a first symbol corresponding to a second signal corresponding to the second uplink transmission). If the third indication information is received, as shown in FIG. 19, the second uplink transmission is transmitted according to the duration of the second signal corresponding to the second uplink transmission indicated by the third indication information; otherwise, the second uplink transmission is transmitted according to the duration of the second signal corresponding to the second uplink transmission indicated by the second indication information.

In at least one embodiment, for a case of the predefined rule, the terminal equipment may adjust the second signal corresponding to the second uplink transmission at least according to a time-domain position relationship between the first uplink transmission and the second uplink transmission (or a time-domain position relationship between signals or time-domain resources corresponding to the first uplink transmission and the second uplink transmission). For example, reducing the duration of the second signal corresponding to the second uplink transmission, including reducing the duration of the second signal to be 0, that is, not transmitting the second signal; or, not transmitting a signal in the second signal overlapping the first uplink transmission; or not transmitting a signal in the second signal overlapping the first uplink transmission and a part of a signal in the second signal not overlapping the first uplink transmission, which shall be described below by way of examples.

Figure 10:
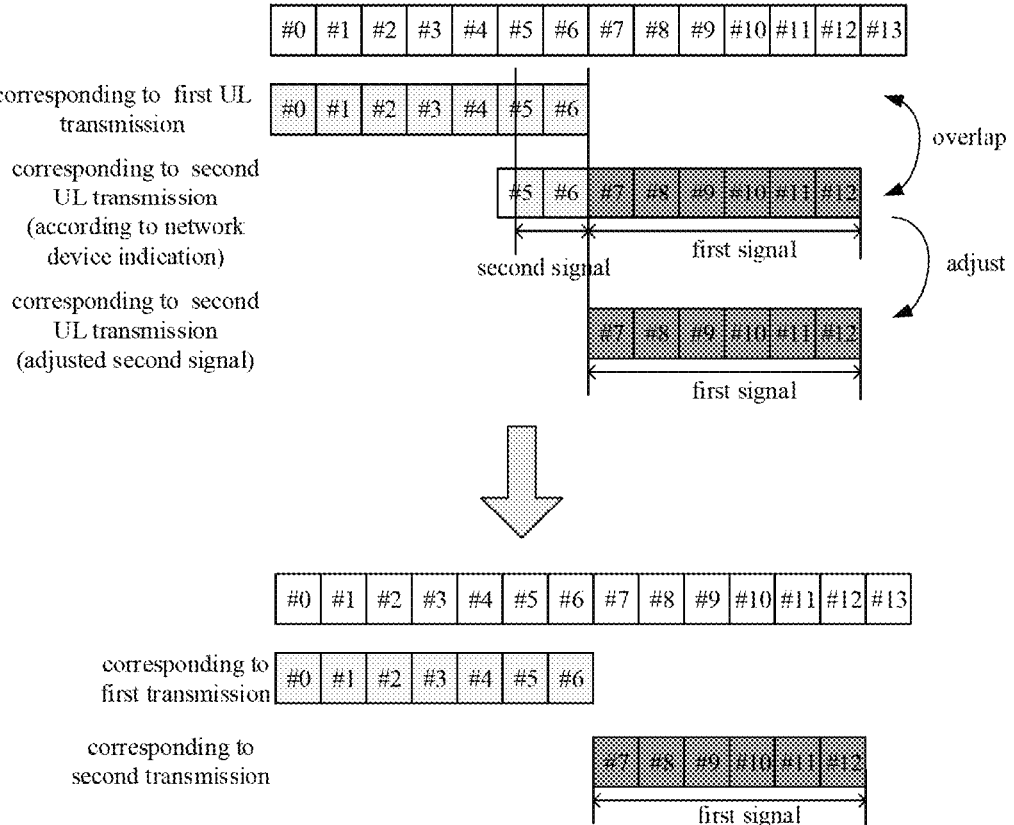
FIG. 10 to FIG. 12 are schematic diagrams of three examples of adjusting a duration of a second signal corresponding to the second uplink transmission in a case where the second signal corresponding to the second uplink transmission overlap a signal corresponding to the first uplink transmission.

FIG. 10 is an example of adjusting the duration of the second signal corresponding to the second uplink transmission. As shown in FIG. 10, in this example, the second signal corresponding to the second uplink transmission overlap the signal corresponding to the first uplink transmission, and the terminal equipment may reduce the duration of the second signal to be 0, that is, it only transmits the first signal corresponding to the second uplink transmission. That is, assuming that the first uplink transmission is before the second uplink transmission, if a time gap between the first signal corresponding to the second uplink transmission and the signal corresponding to the first uplink transmission is 0

(that is, there is no gap), or, in other words, if there is no gap between a time-domain resource corresponding to the first signal corresponding to the second uplink transmission and a time-domain resource corresponding to the first uplink transmission (they are continuous), the UE does not transmit the second signal corresponding to the second uplink transmission.

Figure 11:
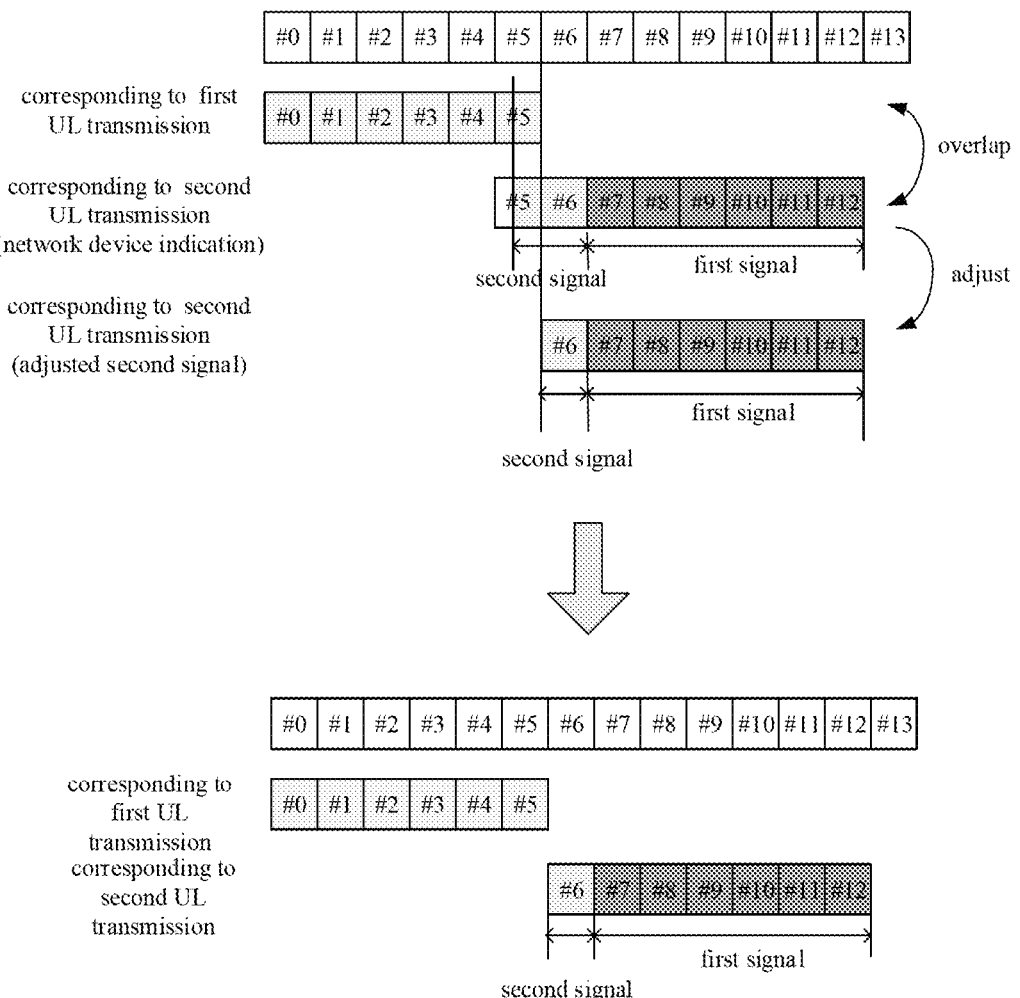

FIG. 11 is another example of adjusting the duration of the second signal corresponding to the second uplink transmission. As shown in FIG. 11, in this example, a part of the second signal corresponding to the second uplink transmission overlap the signal corresponding to the first uplink transmission, and the terminal equipment reduces the duration of the second signal corresponding to the second uplink transmission to be not containing a part overlapping the signal corresponding to the first uplink transmission, that is, it transmits the first signal corresponding to the second uplink transmission and a part of the second signal corresponding to the second uplink transmission, but it does not transmit a signal in the second signal overlapping the first uplink transmission.

Figures 12, 13:
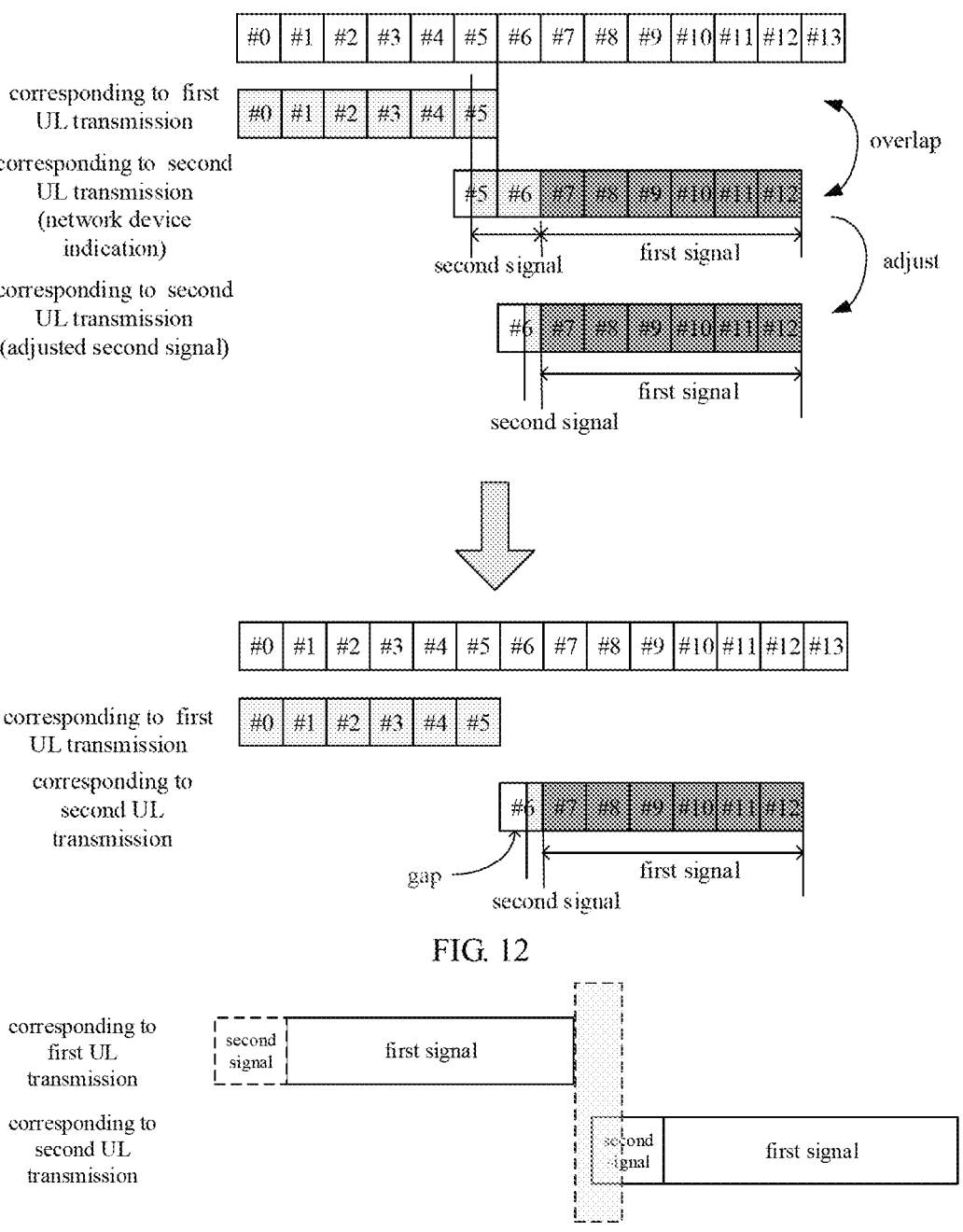
FIG. 13 is a schematic diagram of a gap between the second uplink transmission and the first uplink transmission that is less than a first predefined threshold.

FIG. 12 is a further example of adjusting the duration of the second signal corresponding to the second uplink transmission. As shown in FIG. 12, in this example, a part of the second signal corresponding to the second uplink transmission overlap the signal corresponding to the first uplink transmission, and the terminal equipment reduces the duration of the second signal corresponding to the second uplink transmission to be not containing the part overlapping the signal corresponding to the first uplink transmission nor containing a part that does not overlap, that is, it transmits the first signal corresponding to the second uplink transmission and a part of the second signal corresponding to the second uplink transmission, but does not transmit a signal in the second signal overlapping the first uplink transmission and a part of a signal in the second signal not overlapping the first uplink transmission. Therefore, there is a certain gap between the first uplink transmission and the second uplink transmission, the gap may be used for channel monitoring (e.g. LBT), etc.; however, this disclosure is not limited thereto.

In the embodiment of this disclosure, in at least one embodiment, the gap between the second uplink transmission and the first uplink transmission is smaller than a first predefined threshold. That is, if the gap between the second uplink transmission and the first uplink transmission is smaller than the first predefined threshold, the terminal equipment adjusts the duration of the second signal corresponding to the second uplink transmission, and transmits the first uplink transmission and the adjusted second uplink transmission.

FIG. 13 is a schematic diagram of the gap between the second uplink transmission and the first uplink transmission that is less than the first predefined threshold. As shown in FIG. 13, the gap between the signal corresponding to the first uplink transmission (the first uplink transmission may only correspond to the first signal, or may correspond to the first signal and the second signal) and the signal corresponding to the second uplink transmission may be smaller than a threshold. According to the method of the embodiment of this disclosure, by adjusting the duration of the second signal corresponding to the second uplink transmission, the gap between signals corresponding to the two uplink transmissions may be made to be 0 or less than another threshold (referred to as a second predefined threshold). In this way, after transmitting the first uplink transmission, the terminal equipment may continue to transmit the second uplink transmission, without needing to perform channel detection again before transmitting the second uplink transmission, or may transmit the second uplink transmission by using Cat-2 LBT, thereby lowering power consumption of the terminal equipment.

In the embodiment of this disclosure, the terminal equipment may adjust the duration of the second signal according to the indication of the network device and/or a predefined rule.

For a case of the indication of the network device, similar to the case of overlapping in FIG. 9, the terminal equipment may receive the third indication information before transmitting the uplink transmission, the third indication information being used to indicate the duration of the second signal corresponding to the second uplink transmission; thus, the terminal equipment may transmit the second uplink transmission according to the duration of the second signal corresponding to the second uplink transmission indicated by the third indication information. In the embodiment of this disclosure, the third indication information may be after the second indication information, and the third indication information may be carried by physical layer signaling, such as DCI.

For a case of the predefined rule, the terminal equipment may determine a mode of adjustment according to the predefined rule, such as reducing the duration of the second signal corresponding to the second uplink transmission to be meeting a condition as follows: the gap between the second uplink transmission and the first uplink transmission is 0, or the gap between the second uplink transmission and the first uplink transmission is less than or equal to a second predefined value, the second predefined value being less than the first predefined value, which shall be described below by way of examples.

Figure 14:
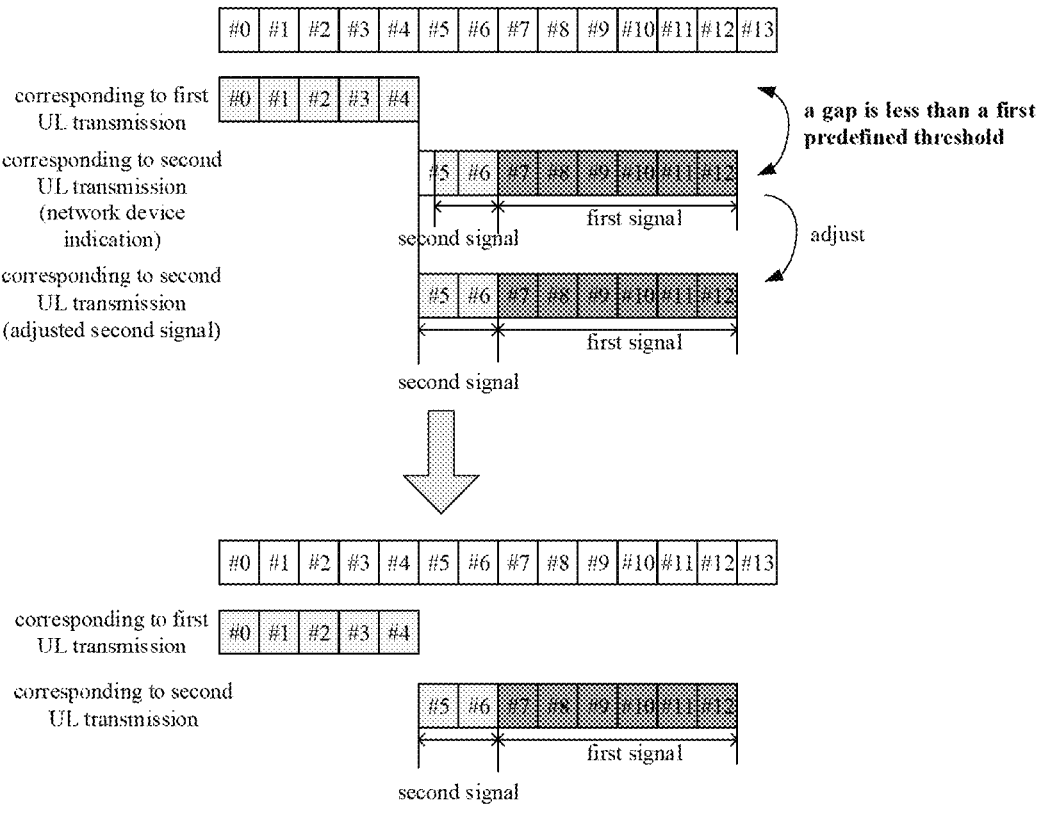
FIG. 14 is a schematic diagram of an example of adjusting the duration of the second signal corresponding to the second uplink transmission in a case where the gap between the second uplink transmission and the first uplink transmission is less than a first predefined threshold.

FIG. 14 is an example of adjusting the duration of the second signal corresponding to the second uplink transmission. As shown in FIG. 14, according to the duration of the second signal corresponding to the second uplink transmission, the gap between the first uplink transmission and the second uplink transmission is less than or equal to a threshold, such as not exceeding 1 symbol, the terminal equipment may increase the duration of the second signal so that the gap is 0 or less than or equal to another threshold.

In the embodiment of this disclosure, that the terminal equipment adjusts the duration of the second signal corresponding to the second uplink transmission (for example, in the case shown in FIG. 9 or the case shown in FIG. 13, the terminal equipment adjusts the duration of the second signal corresponding to the second uplink transmission according to the indication of the network device and/or the predefined rule) may be limited by the following conditions, that is, the terminal equipment adjusts the duration of the second signal corresponding to the second uplink transmission when one or more of the following conditions is/are satisfied:

condition 1: a channel access priority corresponding to the first uplink transmission is lower than or equal to a channel access priority corresponding to the second uplink transmission;

condition 2: the second uplink transmission is within a channel occupancy time (COT) range where the first uplink transmission is located;

condition 3: the second uplink transmission is within a sub-bandwidth range where the first uplink transmission is located; and condition 4: a channel detection result corresponding to the first uplink transmission is idle.

Condition 1 is to determine or judge whether to adjust the duration of the second signal corresponding to the second uplink transmission according to a channel access mode. For example, channel access modes corresponding to the first uplink transmission and the second uplink transmission are indicated by the network device and/or are predefined. When the channel access priority corresponding to the first uplink transmission is lower than or equal to the channel access priority of the second uplink transmission, the duration of the second signal corresponding to the second uplink transmission may be adjusted.

Condition 2 is to determine or judge whether to adjust the duration of the second signal corresponding to the second uplink transmission according to whether the two uplink transmissions are within the same COT range. For example, when the second uplink transmission is within the COT range where the first uplink transmission is located, the duration of the second signal corresponding to the second uplink transmission may be adjusted, which shall be described below by way of examples.

In one example, the terminal equipment determines whether the first uplink transmission and the second uplink transmission are within the COT duration range according to the COT duration indicated by the network device, and if both of them are within the range, the duration of the second signal corresponding to the second uplink transmission may be adjusted. The above indication information indicating the COT duration may be carried by DCI (e.g. DCI format 2_0); however, this disclosure is not limited thereto.

In another example, if Cat-4 LBT is used for the first uplink transmission, and if the second uplink transmission is within a COT duration range corresponding to Cat-4 LBT, the duration of the second signal corresponding to the second uplink transmission may be adjusted.

Condition 3 is to determine whether to adjust the duration of the second signal corresponding to the second uplink transmission according to a frequency-domain positional relationship. For example, if the second uplink transmission is within a range of (LBT) sub-band(s) where the first uplink transmission is located, the duration of the second signal corresponding to the second uplink transmission may be adjusted. That the second uplink transmission is within a range of (LBT) sub-band(s) where the first uplink transmission is located refers to that the first uplink transmission and the second uplink transmission are on the same (LBT) sub-band, or the second uplink transmission is on one or more (LBT) sub-band(s) of the (LBT) sub-band(s) where the first upstream transmission is located.

Condition 4 is to determine whether to adjust the duration of the second signal corresponding to the second uplink transmission according to a transmitting situation of the first uplink transmission. Considering that the first uplink transmission may not be transmitted due to an LBT failure, the terminal equipment may need to determine whether to adjust the duration of the second signal corresponding to the second uplink transmission according to the transmitting situation of the first uplink transmission.

Figure 15:
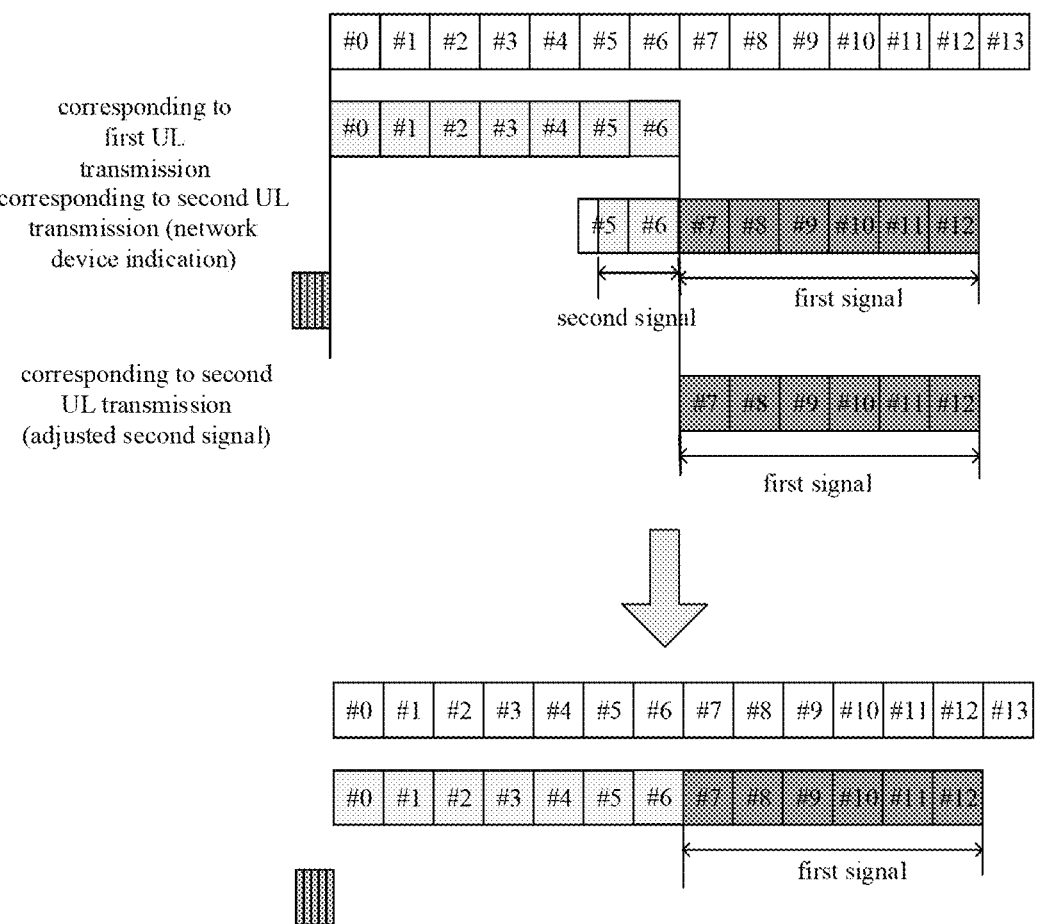
FIG. 15 is a schematic diagram of adjusting the duration of the second signal corresponding to the second uplink transmission in a case where LBT is successful and the first uplink transmission is transmitted.
Figures 16, 17:
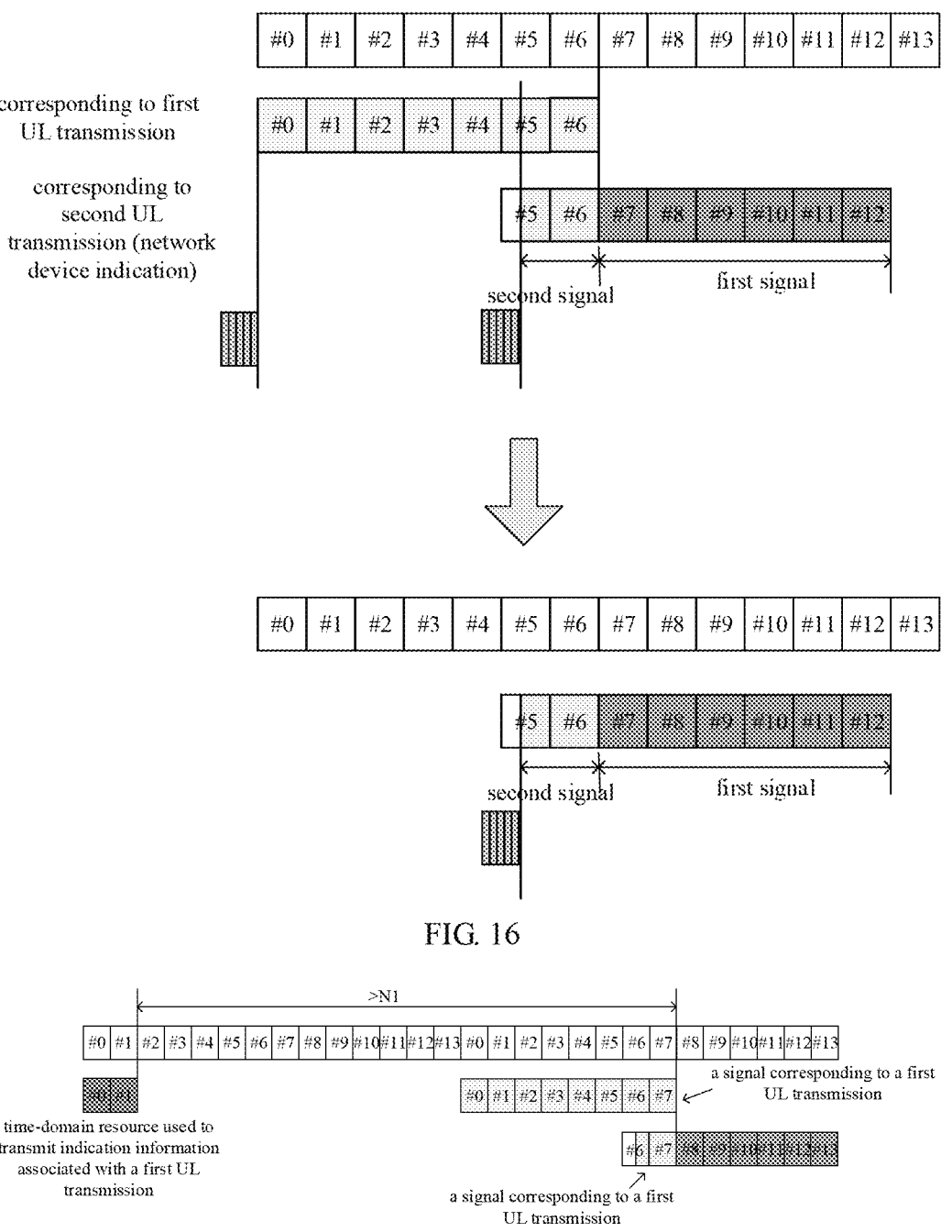

For example, if the LBT corresponding to the first uplink transmission is successful (e.g. the channel detection result is idle), the duration of the second signal corresponding to the second uplink transmission is adjusted and the second uplink transmission is transmitted, as shown in FIG. 15. On the contrary, if the LBT corresponding to the first uplink transmission is unsuccessful (for example, the channel detection result is busy), the duration of the second signal corresponding to the second uplink transmission may not be adjusted, as shown in FIG. 16.

In the embodiment of this disclosure, in some cases, whether the terminal equipment may adjust the duration of the second signal corresponding to the second uplink transmission is also limited by a processing time needed by the terminal equipment. The processing time includes, for example, a time needed by the terminal equipment in preparing (or generating) the first uplink transmission and/or the second uplink transmission. Therefore, in these cases, if whether the terminal equipment adjusts the duration of the second signal of the second uplink transmission is limited by one or more of the above conditions, the terminal equipment should be able to determine that the one or more of the conditions is/are satisfied at least before a certain time (at least greater than the processing time needed by the terminal equipment) prior to the second uplink transmission before adjusting the duration of the second signal corresponding to the second uplink transmission, and if the terminal equipment can not determine the one or more conditions is/are satisfied before the certain time, the duration of the second signal corresponding to the second uplink transmission is not adjusted.

In one example, before transmitting the second uplink transmission, the terminal equipment receives indication information (e.g. DCI) associated with the first uplink transmission. The indication information associated with the first uplink transmission is, for example, used to indicate a time-frequency domain resource, and a channel access mode, etc., corresponding to the first uplink transmission. If a gap between the first reference symbol corresponding to the indication information associated with the first uplink transmission (such as a last symbol of a time-domain resource used to transmit the indication information) and a second reference symbol corresponding to the second uplink transmission (such as a first symbol corresponding to a first signal corresponding to the second uplink transmission, or a first symbol corresponding to a second signal corresponding to the second uplink transmission) is greater than (or greater than or equal to) the first predetermined number (N1) of symbols, as shown in FIG. 17, the duration of the second signal corresponding to the second uplink transmission may be adjusted.

That is, if the gap between the first reference symbol corresponding to the indication information associated with the first uplink transmission and the second reference symbol corresponding to the second uplink transmission is less than or equal to (or less than) the first predetermined number (N1) of symbols, the terminal equipment does not adjust the duration of the second signal corresponding to the second uplink transmission. And in general, if the gap between the first reference symbol corresponding to the indication information associated with the first uplink transmission and the second reference symbol corresponding to the second uplink transmission is less than or equal to the first predetermined number (N1) of symbols, the terminal equipment does not transmit the second uplink transmission.

This example is applicable to the above condition 1 and/or condition 3, and is also applicable to cases where there exist no above conditions 1-4, which shall not be repeated herein any further.

In another example, for the above case where whether the duration of the second signal corresponding to the second uplink transmission is adjusted is determined according to the transmitting situation of the first uplink transmission, that is, for the above condition 4, if a gap between the first reference symbol corresponding to the first uplink transmission (such as a first symbol corresponding to the first signal corresponding to the first uplink transmission, or a first symbol corresponding to the second signal corresponding to the first uplink transmission) and a second reference symbol corresponding to the second uplink transmission (such as a first symbol corresponding to the first signal corresponding to the second uplink transmission, or a first symbol corresponding to the second signal corresponding to the second uplink transmission) is greater than or equal to (or greater than) a second predetermined number (N2), as shown in FIG. 18, whether the duration of the second signal corresponding to the second uplink transmission is adjusted may be determined according to the transmitting situation of the first uplink transmission.

In a further example, for the case where whether the first uplink transmission and the second uplink transmission are within the range of COT duration is determined according to the COT duration indicated by the network device, that is, for the above condition 2, before transmitting the second uplink transmission, the terminal equipment receives indication information for indicating the COT duration, the indication information may be carried by DCI format 2_0; however, this disclosure is not limited thereto. If a gap between a first reference symbol corresponding to the indication information (such as a last symbol of a time-domain resource used to transmit the indication information) and a second reference symbol corresponding to the second uplink transmission (such as a first symbol corresponding to the first signal corresponding to the second uplink transmission, or a first symbol corresponding to the second signal corresponding to the second uplink transmission) is greater than (or greater than or equal to) a fourth predefined number (N4) of symbols, as shown in FIG. 20, the duration of the second signal corresponding to the second uplink transmission may be adjusted.

That is, if the gap between the first reference symbol corresponding to the indication information used to indicate the COT duration and the second reference symbol corresponding to the second uplink transmission is less than or equal to (or less than) the fourth predefined number (N4) of symbols, the terminal equipment does not adjust the duration of the second signal corresponding to the second uplink transmission.

In the embodiment of this disclosure, as described above, the uplink transmission may be a PUSCH, a PUCCH, a PRACH, and an SRS, etc., and the uplink transmission may be semi-statically configured, semi-persistently scheduled or dynamically scheduled. The types of the first uplink transmission and the second uplink transmission may be identical or different. Considering a specific uplink transmission type, some examples of the first uplink transmission and the second uplink transmission are provided below.

In one example, the first uplink transmission and the second uplink transmission are a PUSCH and a PUCCH, respectively. For example, the first uplink transmission is a PUSCH (such as a PUSCH without a UL-SCH), and the second uplink transmission is a PUCCH (such as a PUCCH with a positive SR).

In another example, the first uplink transmission and the second uplink transmission are scheduled PUSCH (scheduled by DCI or RAR) and a configured grant PUSCH (Type 1 or Type 2), respectively. For an MAC layer of the terminal equipment, if the configured uplink grant and the uplink grant received in PDCCH/RAR overlap due to the CP extension, the MAC layer may deem that the configured uplink grant and the uplink grant received in PDCCH/RAR do not overlap (that is, in this case, the MAC layer determines whether the two uplink transmissions overlap according only to the first signal corresponding to the uplink transmission or the time-domain resource corresponding to the first signal), and prepares MAC PDUs respectively for the configured uplink grant and uplink grant received in PDCCH/RAR. The configured uplink grant and the uplink grant received correspond to identical or different HARQ processes. On the other hand, an HARQ process ID corresponding to the configured uplink grant is determined according to a first symbol corresponding to a first signal to which it corresponds.

In the embodiment of this disclosure, the first uplink transmission and the second uplink transmission may be located on the same carrier, or may be located on different carriers. Considering two uplink transmissions on different carriers, if a signal corresponding to a former uplink transmission (the first uplink transmission) overlaps a second signal corresponding to a latter transmission (the second uplink transmission), in order to ensure total transmitting power on a symbol does not exceed maximum transmitting power ($\hat{P}_{CMAX}(i)$) of the terminal equipment, in this case, the terminal equipment may determine the transmitting power of the two uplink transmissions or whether they may be transmitted according to a priority of uplink transmission used for power control. The total transmitting power on a symbol is a sum of linear values of transmitting power of one or more uplink transmissions (PUSCH, PUCCH, PRACH and SRS) corresponding to the symbol or the first signal or the second signal corresponding to one or more uplink transmissions.

For one uplink transmission, the terminal equipment needs to calculate transmitting power according to a pathloss, and the terminal equipment determines the pathloss according to a QCL relationship between SSBs. Specifically, the terminal equipment determines the pathloss according to two or more SSBs of QCLed corresponding to different SSB (position) indices. If SCS of the SSB is equal to 15 kHz, a value range of an SSB (position) index is an integer from 0-9. And if the SCS of the SSB is equal to 30 kHz, the value range of the SSB (position) index is an integer from 0-19.

In the embodiment of this disclosure, as described above, as shown in FIG. 5, the second uplink transmission may correspond to a first time-domain resource, the first signal corresponding to the second uplink transmission corresponds to a first resource of the first time-domain resource, the second signal corresponding to the second uplink transmission corresponds to a second resource of the first time-domain resource, and a time length of the second resource is greater than a duration of the second signal. In addition, as described above, the second signal may be CP extension transmitted in the second resource.

In the embodiment of this disclosure, as described above, the second signal corresponding to the second uplink transmission are before the first signal corresponding to the second uplink transmission, the first signal corresponding to the second uplink transmission belongs to the second uplink transmission, and the second signal corresponding to the second uplink transmission belong to or do not belong to the second uplink transmission. FIG. 2 shows a case in which the second signal corresponding to the second uplink transmission belongs to the second uplink transmission, and FIG. 3 shows a case in which the second signal corresponding to the second uplink transmission does not belong to the second uplink transmission.

FIG. 21 is another schematic diagram of the method for transmitting uplink transmission of the embodiment of this disclosure. As shown in FIG. 21, the method includes:

operation 2101: a terminal equipment receives second indication information, the second indication information being used to indicate a duration of a second signal corresponding to a second uplink transmission; and operation 2102: the terminal equipment transmits a first uplink transmission or transmits the second uplink transmission, a signal corresponding to the first uplink transmission overlapping the second signal corresponding to the second uplink transmission.

In the embodiment of FIG. 21, different from the embodiment of FIG. 8, the terminal equipment does not adjust the duration of the second signal corresponding to the second uplink transmission, but transmits one of the first uplink transmission and the second uplink transmission, that is, if the second signal corresponding to the second uplink transmission overlaps the first uplink transmission, the terminal equipment transmits one of the first uplink transmission and the second uplink transmission. In this way, cross modulation interference of the uplink transmissions may be reduced, reliability of the uplink transmissions may be ensured, and a higher transmission efficiency may be obtained.

Optionally, in the embodiment of FIG. 21, the first signal corresponding to the second uplink transmission and the signal corresponding to the first uplink transmission do not overlap, that is, only the second signal corresponding to the second uplink transmission and the signal corresponding to the first uplink transmission overlap. That is, if the second signal corresponding to the second uplink transmission overlaps the first uplink transmission, the terminal equipment transmits one of the first uplink transmission and the second uplink transmission.

In the embodiment of FIG. 21, concepts of "the first uplink transmission" and "the second uplink transmission" are identical to those described above, and shall not be described here any further.

In the embodiment of this disclosure, as described above, the uplink transmissions may be PUSCH, PUCCH, PRACH, SRS, etc., and the uplink transmission may be semi-statically configured, semi-persistently scheduled or dynamically scheduled. The types of the first uplink transmission and the second uplink transmission may be identical or different. Considering specific types of uplink transmissions, some examples of the first uplink transmission and the second uplink transmission are provided below.

In an example, the first uplink transmission and the second uplink transmission are a scheduled PUSCH (which is scheduled by DCI or RAR) and a configured grant PUSCH (Type 1 or Type 2), respectively. In the standards, there may be following descriptions: The dynamically allocated uplink transmission overrides the configured uplink grant in the same serving cell, if they overlap in time, including overlap due to CP extension. Otherwise an uplink transmission according to the configured uplink grant is assumed, if activated.

For example, for the MAC layer of the terminal equipment, if the configured uplink grant and the uplink grant received in PDCCH/RAR overlap due to the CP extension, it may be deemed that the configured uplink grant is unavailable, and no MAC PDU is prepared for the configured uplink grant. The configured uplink grant and the uplink grant received correspond to identical or different HARQ processes. And on the other hand, an HARQ process ID corresponding to the configured uplink grant is determined according to a first symbol corresponding to a first signal to which it corresponds.

In the embodiment of FIG. 21, in conjunction with the previous embodiments, it is also possible to determine whether to adjust the duration of the second signal corresponding to the second uplink transmission or perform no adjustment and transmit one of the first uplink transmission and the second uplink transmission according to the processing time needed by the terminal equipment. That is, if whether the terminal equipment adjusts the duration of the second signal of the second uplink transmission is limited by the above one or more conditions, if the terminal equipment is able to determine that the one or more conditions are satisfied before a certain time prior to the second uplink transmission, it adjusts the duration of the second signal corresponding to the second uplink transmission; otherwise, it does not adjust the duration of the second signal corresponding to the second uplink transmission but transmits one of the first uplink transmission and the second uplink transmission. The certain time of the terminal equipment before the second uplink transmission is at least greater than the processing time needed by the terminal equipment, and the processing time includes, for example, the time needed by the terminal equipment in preparing (or generating) the first uplink transmission and/or the second uplink transmission.

For example, as described above, for the case of determining whether the first uplink transmission and the second uplink transmission are within the range of COT duration according to the COT duration indicated by the network device, that is, for the above condition 2, the terminal equipment may receive indication information used to indicate the COT duration, and if the gap between a first reference symbol corresponding to the indication information and a second reference symbol corresponding to the second uplink transmission is greater than or equal to a fourth predetermined number (N4) of symbols, whether the first uplink transmission and the second uplink transmission are within the same COT may be determined according to the indication information, and if yes, that is, condition 2 is satisfied, the duration of the second signal corresponding to the second uplink transmission may be adjusted; otherwise, it is deemed that the second uplink transmission can not be transmitted by adjusting the duration of the second signal, and one of the first uplink transmission and the second uplink transmission may be transmitted according to the embodiment of this disclosure.

In the embodiment of this disclosure, in some embodiments, the terminal equipment may also determine whether the two uplink transmissions may be transmitted according to whether two uplink transmissions are in the same slot; for example, for the same carrier or different carriers of the same FR (frequency band), if a PRACH and PUSCH/PUCCH/SRS are in the same slot, the terminal equipment may only transmit one of them (PRACH, or PUSCH/PUCCH/SRS). Considering that the uplink transmission may correspond to the second signal, in this case, the terminal equipment may determine whether the two uplink transmissions are in the same slot according to the second signal corresponding to the uplink transmission. For example, in the case shown in FIG. 22, the terminal equipment only transmits one of the uplink transmissions.

According to the embodiment of this disclosure, considering a time-domain position relationship between two uplink transmissions of the same device (or a time-domain position relationship between signals or time-domain resources corresponding to the two uplink transmissions), in a case where the second uplink transmission may possibly correspond to the second signal, if the signal corresponding to the first uplink transmission overlaps the second signal corresponding to the second uplink transmission, or, if a gap between the first uplink transmission and the second uplink transmission is less than a certain threshold, one of the uplink transmissions may be selected for transmission, or the duration of the second signal corresponding to the uplink transmission may be adjusted, and the adjusted duration of the second signal is used to transmit the uplink transmission. Hence, a higher transmission efficiency may be obtained.

Second Aspect of the Embodiments

The second aspect of the embodiments of this disclosure provides a method for receiving uplink transmission, applicable to a network device, such as the above gNB, etc. This method is processing at a network side corresponding to the method of the first aspect of the embodiments, with contents identical to those in the first aspect of the embodiments being not going to be described herein any further.

Figures 22, 23, 24, 25, 26:
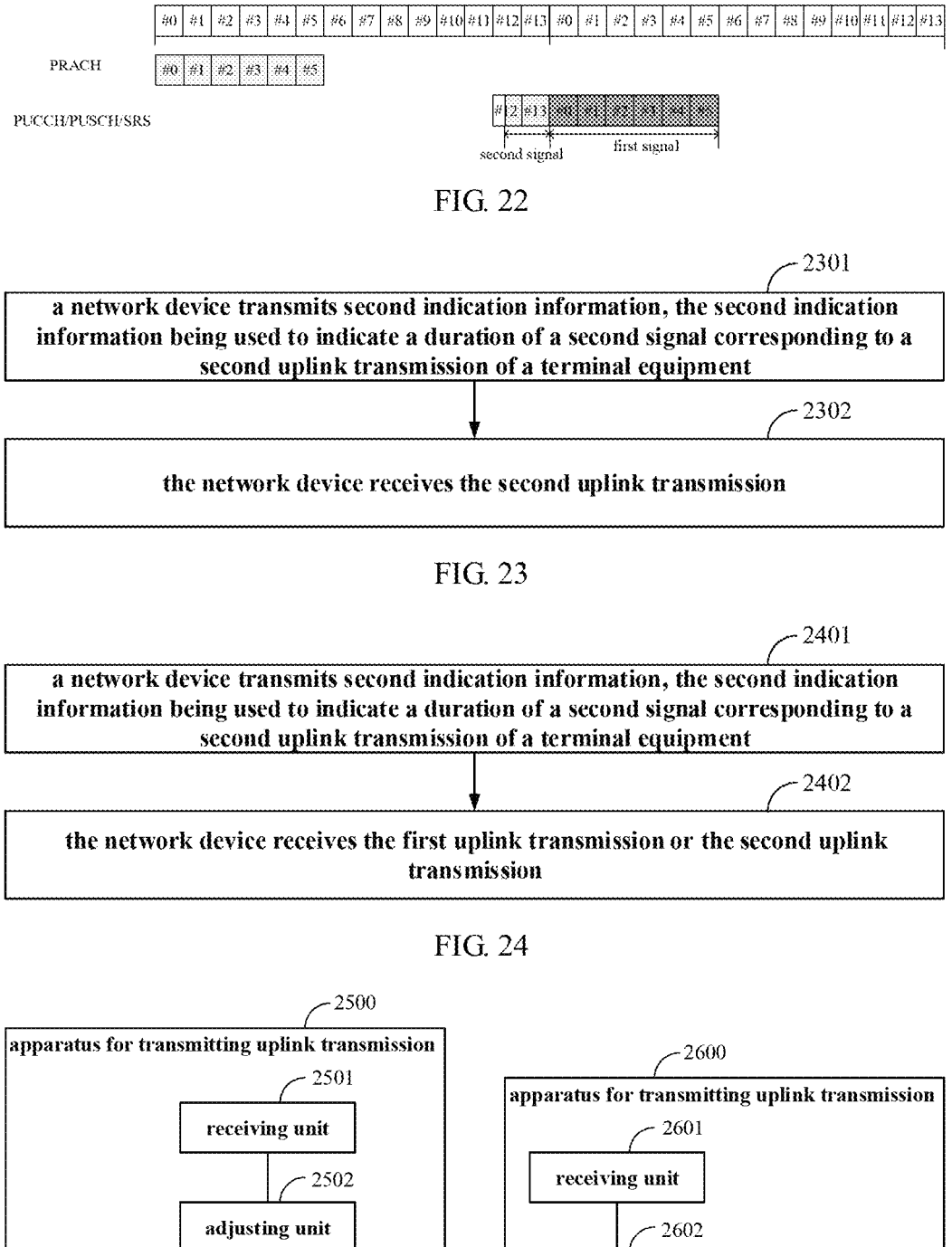
FIG. 22 is a schematic diagram of two uplink transmissions that are in the same slot.
FIG. 23 is a schematic diagram of the method for receiving uplink transmission of a second aspect of embodiments.
FIG. 24 is another schematic diagram of the method for receiving uplink transmission of the second aspect of embodiments.
FIG. 25 is a schematic diagram of the apparatus for transmitting uplink transmission of a third aspect of embodiments.
FIG. 26 is another schematic diagram of the apparatus for transmitting uplink transmission of the third aspect of embodiments.

FIG. 23 is a schematic diagram of the method for receiving uplink transmission of the embodiments of this disclosure. As shown in FIG. 23, the method includes:

operation 2301: a network device transmits second indication information, the second indication information being used to indicate a duration of a second signal corresponding to a second uplink transmission of a terminal equipment, the terminal equipment adjusting the duration of the second signal corresponding to the second uplink transmission and transmitting the adjusted second uplink transmission; and operation 2302: the network device receives the second uplink transmission.

In at least one embodiment, the signal corresponding to the second uplink transmission overlap the signal corresponding to the first uplink transmission, as shown in FIG. 9.

In at least one embodiment, a gap between the second uplink transmission and the first uplink transmission is less than a first predefined threshold, as shown in FIG. 13.

In at least one embodiment, the network device may further transmit third indication information, the third indication information being used to indicate a second signal corresponding to the second uplink transmission, and the terminal equipment transmits the second uplink transmission according to the duration of the second signal corresponding to the second uplink transmission indicated by the third indication information. Hence, adjustment of the duration of the second signal corresponding to the second uplink transmission by the terminal equipment indicated by the network device is achieved.

In the embodiment of this disclosure, the method in FIG. 23 is processing at the network side corresponding to the method in FIG. 8. Reference may be made to the first aspect of the embodiments for processing of the terminal equipment, which shall not be described herein any further.

FIG. 24 is another schematic diagram of the method for receiving uplink transmission of the embodiments of this disclosure. As shown in FIG. 24, the method includes:

operation 2401: a network device transmits second indication information, the second indication information being used to indicate a duration of a second signal corresponding to a second uplink transmission of a terminal equipment, the terminal equipment transmitting first uplink transmission or the second uplink transmission, a signal corresponding to the first uplink transmission overlapping a second signal corresponding to the second uplink transmission; and operation 2402: the network device receives the first uplink transmission or the second uplink transmission.

In the embodiment of this disclosure, the method in FIG. 24 is processing at the network side corresponding to the method in FIG. 21. Reference may be made to the first aspect of the embodiments for processing by the terminal equipment, which shall not be described herein any further.

In the embodiment of this disclosure, as described above, the first uplink transmission and the second uplink transmission are located on the same carrier, or are located on different carriers.

In the embodiment of this disclosure, as described above, the first uplink transmission corresponds to the first signal only, or the first uplink transmission corresponds to the first signal and the second signal.

In the embodiment of this disclosure, as described above, the first uplink transmission and the second uplink transmission are one of the following: a PUSCH, a PUCCH, a PRACH, and an SRS, respectively.

In at least one embodiment, as described above, the second signal is CP extension.

In the embodiment of this disclosure, as described above, the second uplink transmission corresponds to a first time-domain resource, a first signal corresponding to the second uplink transmission corresponds to a first resource of the first time-domain resource, the second signal corresponding to the second uplink transmission corresponds to a second resource of the first time-domain resource, and a time length of the second resource is greater than a duration of the second signal.

In the embodiment of this disclosure, as described above, the second signal corresponding to the second uplink transmission is before the first signal corresponding to the second uplink transmission, the first signal corresponding to the second uplink transmission belongs to the second uplink transmission, and the second signal corresponding to the second uplink transmission belongs to or does not belong to the second uplink transmission.

According to the embodiment of this disclosure, a higher transmission efficiency may be obtained.

Third Aspect of the Embodiments

The third aspect of the embodiments of this disclosure provides an apparatus for transmitting uplink transmission, configured in a terminal equipment. As principles of the apparatus for solving problems are similar to that of the method of the first aspect of the embodiments, reference may be made to the implementations of the method of the first aspect of the embodiments for particular implementations of the apparatus, with identical parts being not going to be described herein any further.

FIG. 25 is a schematic diagram of the apparatus for transmitting uplink transmission of the embodiment of this disclosure. As shown in FIG. 25, the apparatus 2500 includes:

a receiving unit 2501 configured to receive second indication information, the second indication information being used to indicate a duration of a second signal corresponding to a second uplink transmission;

an adjusting unit 2502 configured to adjust the duration of the second signal corresponding to the second uplink transmission; and a transmitting unit 2503 configured to transmit the adjusted second uplink transmission.

In some embodiments, the second signal corresponding to the second uplink transmission overlaps a signal corresponding to a first uplink transmission.

In some embodiments, a first signal corresponding to the second uplink transmission does not overlap a signal corresponding to a first uplink transmission.

In some embodiments, a gap between the second uplink transmission and the first uplink transmission is less than a first predefined threshold.

In some embodiments, the first uplink transmission and the second uplink transmission are located on the same carrier or located on different carriers.

In some embodiments, the first uplink transmission corresponds to a first signal only, or the first uplink transmission corresponds to a first signal and a second signal.

In some embodiments, the first uplink transmission and the second uplink transmission are respectively one of the following: a PUSCH, a PUCCH, a PRACH, and an SRS.

In some embodiments, the second signal is CP extension.

In some embodiments, the second uplink transmission corresponds to a first time-domain resource, a first signal corresponding to the second uplink transmission corresponds to a first resource of the first time-domain resource, the second signal corresponding to the second uplink transmission corresponds to a second resource of the first time-domain resource, and a time length of the second resource is greater than a duration of the second signal.

In some embodiments, the second signal corresponding to the second uplink transmission is before the first signal corresponding to the second uplink transmission, the first signal corresponding to the second uplink transmission belongs to the second uplink transmission, the second signal corresponding to the second uplink transmission belongs to or does not belong to the second uplink transmission.

In some embodiments, if the second signal corresponding to the second uplink transmission overlaps the first uplink transmission, the terminal equipment adjusts the duration of the second signal corresponding to the second uplink transmission, and transmits the second uplink transmission according to the adjusted duration of the second signal.

In some embodiments, that the adjusting unit 2502 adjusts the duration of the second signal corresponding to the second uplink transmission includes: adjusting by the adjusting unit 2502 that the transmitting unit 2503 does not transmit the second signal; or, adjusting by the adjusting unit 2502 that the transmitting unit 2503 does not transmit a signal in the second signal overlapping the first uplink transmission; or, adjusting by the adjusting unit 2502 that the transmitting unit 2503 does not transmit a signal in the second signal overlapping the first uplink transmission and a part of a signal in the second signal not overlapping the first uplink transmission.

In some embodiments, if the gap between the second uplink transmission and the first uplink transmission is smaller than the first predefined threshold, the adjusting unit 2502 adjusts the duration of the second signal corresponding to the second uplink transmission, and the transmitting unit 2503 transmits the first uplink transmission and the adjusted second uplink transmission.

In some embodiments, the adjusting unit 2502 adjusts the duration of the second signal corresponding to the second uplink transmission to be satisfying a condition as below that:
  the gap between the second uplink transmission and the first uplink transmission is 0, or
  the gap between the second uplink transmission and the first uplink transmission is less than or equal to a second predetermined threshold, the second predetermined threshold being less than the first predetermined threshold.

In some embodiments, the receiving unit 2501 further receives third indication information, the third indication information being used to indicate a duration of a second signal corresponding to the second uplink transmission; and the transmitting unit 2503 transmits the second uplink transmission according to the duration of the second signal corresponding to the second uplink transmission indicated by the third indication information.

In some embodiments, the third indication information is after the second indication information.

In some embodiments, the third indication information is carried by physical layer signaling.

In some embodiments, the adjusting unit 2502 adjusts the duration of the second signal corresponding to the second uplink transmission when one or more of the following conditions are satisfied that:
  a channel access priority corresponding to the first uplink transmission is lower than or equal to a channel access priority corresponding to the second uplink transmission;
  the second uplink transmission is within a channel occupation time (COT) range where the first uplink transmission is in;
  the second uplink transmission is within a sub-bandwidth range where the first uplink transmission is in; and
  a channel detection result corresponding to the first uplink transmission is idle.

In some embodiments, a gap between a first reference symbol corresponding to indication information associated with the first uplink transmission and a second reference symbol corresponding to the second uplink transmission is greater than or equal to a first predetermined number (N1) of symbols.

In some embodiments, the first reference symbol corresponding to the indication information associated with the first uplink transmission is: a last reference symbol corresponding to the indication information associated with the first uplink transmission.

In some embodiments, the indication information associated with the first uplink transmission is: uplink grant DCI.

In some embodiments, the second reference symbol corresponding to the second uplink transmission is: a first symbol corresponding to the first signal corresponding to the second uplink transmission, or a first symbol corresponding to the second signal corresponding to the second uplink transmission.

In some embodiments, a gap between the first reference symbol corresponding to the first uplink transmission and the second reference symbol corresponding to the second uplink transmission is greater than or equal to a second predefined number (N2) of symbols.

In some embodiments, the first reference symbol corresponding to the first uplink transmission is: a first symbol corresponding to the first uplink transmission.

In some embodiments, the second reference symbol corresponding to the second uplink transmission is: a first symbol corresponding to the first signal corresponding to the second uplink transmission, or a first symbol corresponding to the second signal corresponding to the second uplink transmission.

In some embodiments, a gap between a first reference symbol corresponding to the third indication information and the second reference symbol corresponding to the second uplink transmission is greater than or equal to a third predetermined number (N3) of symbols.

In some embodiments, the second reference symbol corresponding to the second uplink transmission is: a first symbol corresponding to the first signal corresponding to the second uplink transmission, or a first symbol corresponding to the second signal corresponding to the second uplink transmission.

In some embodiments, a gap between a first reference symbol corresponding to the indication information used to indicate the COT duration transmitted by the network device and the second reference symbol corresponding to the second uplink transmission is greater than or equal to a fourth predetermined number (N4) of symbols.

In some embodiments, the indication information is carried by DCI format 2_0.

Reference may be made to the implementations of the steps in FIG. 8 for implementations of the components of the apparatus for transmitting uplink transmission shown in FIG. 25, which shall not be described herein any further.

FIG. 26 is another schematic diagram of an apparatus for transmitting uplink transmission of the embodiment of this disclosure. As shown in FIG. 26, the apparatus 2600 includes:

a receiving unit 2601 configured to receive second indication information, the second indication information being used to indicate a duration of a second signal corresponding to a second uplink transmission; and a transmitting unit 2602 configured to transmit first uplink transmission or transmit the second uplink transmission, a signal corresponding to the first uplink transmission overlapping the second signal corresponding to the second uplink transmission.

In some embodiments, a first signal corresponding to the second uplink transmission does not overlap a signal corresponding to the first uplink transmission.

In some embodiments, if the second signal corresponding to the second uplink transmission overlaps the first uplink transmission, the terminal equipment transmits one of the first uplink transmission and the second uplink transmission.

In some embodiments, the first uplink transmission and the second uplink transmission are located on the same carrier or on different carriers.

In some embodiments, the first uplink transmission corresponds to only the first signal, or the first uplink transmission corresponds to the first signal and the second signal.

In some embodiments, the first uplink transmission and the second uplink transmission are respectively one of the following: a PUSCH, a PUCCH, a PRACH, and an SRS.

In some embodiments, the second signal is CP extension.

In some embodiments, the second uplink transmission corresponds to a first time-domain resource, a first signal corresponding to the second uplink transmission corresponds to a first resource of the first time-domain resource, a second signal corresponding to the second uplink transmission corresponds to a second resource of the first time-domain resource, and a time length of the second resource is greater than a duration of the second signal.

In some embodiments, the second signal corresponding to the second uplink transmission is before the first signal corresponding to the second uplink transmission, the first signal corresponding to the second uplink transmission belongs to the second uplink transmission, the second signal corresponding to the second uplink transmission belongs to or does not belong to the second uplink transmission.

Reference may be made to the implementations of the steps in FIG. 21 for implementations of the components of the apparatus for transmitting uplink transmission shown in FIG. 26, which shall not be described herein any further.

According to the embodiment of this disclosure, a higher transmission efficiency may be obtained.

Fourth Aspect of the Embodiments

The fourth aspect of the embodiments of this disclosure provides an apparatus for receiving uplink transmission, configured in a network device. As a principle of the apparatus for solving problems is similar to that of the method of the second aspect of the embodiments, reference may be made to the implementations of the method of the second aspect of the embodiments for particular implementations of the apparatus, with identical parts being not going to be described herein any further.

Figures 27, 28, 29:
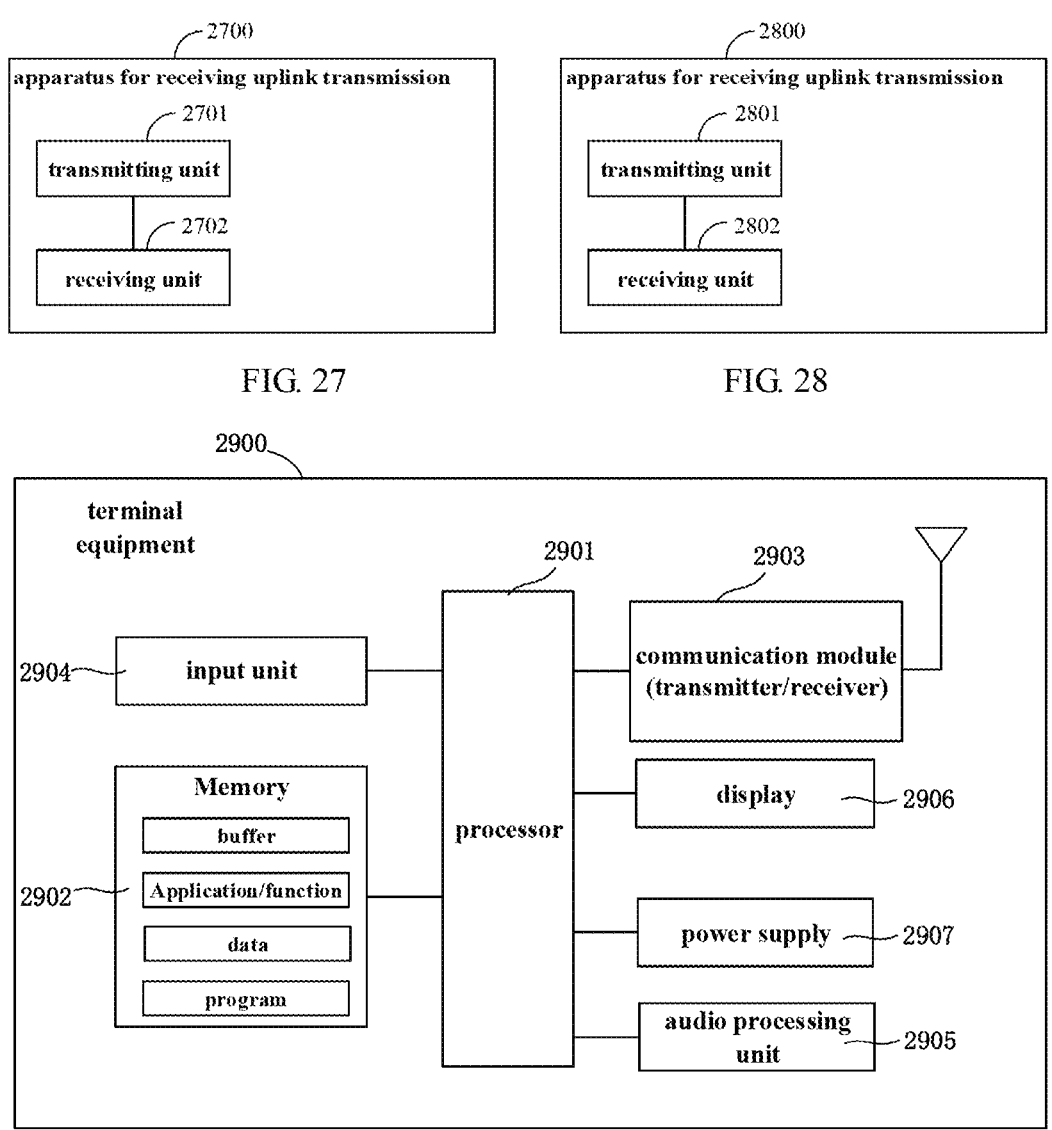
FIG. 27 is a schematic diagram of the apparatus for receiving uplink transmission of a fourth aspect of embodiments.
FIG. 28 is another schematic diagram of the apparatus for receiving uplink transmission of the fourth aspect of embodiments.
FIG. 29 is a schematic diagram of the terminal equipment of a fifth aspect of embodiments.

FIG. 27 is a schematic diagram of the apparatus for receiving uplink transmission according to the embodiment of this disclosure. As shown in FIG. 27, the apparatus 2700 includes:

a transmitting unit 2701 configured to transmit second indication information, the second indication information being used to indicate a duration of a second signal corresponding to a second uplink transmission of a terminal equipment, the terminal equipment adjusts the duration of the second signal corresponding to the second uplink transmission and transmits the adjusted second uplink transmission; and a receiving unit 2702 configured to receive the second uplink transmission.

In some embodiments, the second signal corresponding to the second uplink transmission overlaps the signal corresponding to the first uplink transmission.

In some embodiments, a gap between the second uplink transmission and the first uplink transmission is less than a first predefined threshold.

In some embodiments, the transmitting unit 2701 further transmits third indication information, the third indication information being used to indicate second signal corresponding to the second uplink transmission, and the terminal equipment transmits the second uplink transmission according to the duration of the second signal corresponding to the second uplink transmission indicated by the third indication information.

In some embodiments, the first uplink transmission and the second uplink transmission are located on the same carrier or on different carriers.

In some embodiments, the first uplink transmission corresponds to only the first signal, or the first uplink transmission corresponds to the first signal and the second signal.

In some embodiments, the first uplink transmission and the second uplink transmission are respectively one of the following: a PUSCH, a PUCCH, a PRACH, and an SRS.

In some embodiments, the second signal is CP extension.

In some embodiments, the second uplink transmission corresponds to a first time-domain resource, a first signal corresponding to the second uplink transmission corresponds to a first resource of the first time-domain resource, the second signal corresponding to the second uplink transmission corresponds to a second resource of the first time-domain resource, and a time length of the second resource is greater than a duration of the second signal.

In some embodiments, the second signal corresponding to the second uplink transmission is before the first signal corresponding to the second uplink transmission, the first signal corresponding to the second uplink transmission belongs to the second uplink transmission, the second signal corresponding to the second uplink transmission belongs to or does not belong to the second uplink transmission.

Reference may be made to the implementations of the steps in FIG. 23 for implementations of the components of the apparatus for receiving uplink transmission shown in FIG. 27, which shall not be described herein any further.

FIG. 28 is another schematic diagram of the apparatus for receiving uplink transmission of the embodiment of this disclosure. As shown in FIG. 28, the apparatus 2800 includes:

a transmitting unit 2801 configured to transmit second indication information, the second indication information being used to indicate a duration of a second signal corresponding to a second uplink transmission of a terminal equipment, the terminal equipment transmits first uplink transmission or the second uplink transmission, a signal corresponding to the first uplink transmission overlaps a second signal corresponding to the second uplink transmission; and a receiving unit 2802 configured to receive the first uplink transmission or the second uplink transmission.

In some embodiments, the first uplink transmission and the second uplink transmission are located on the same carrier or on different carriers.

In some embodiments, the first uplink transmission corresponds to only the first signal, or the first uplink transmission corresponds to the first signal and the second signal.

In some embodiments, the first uplink transmission and the second uplink transmission are respectively one of the following: a PUSCH, a PUCCH, a PRACH, and an SRS.

In some embodiments, the second signal is CP extension.

In some embodiments, the second uplink transmission corresponds to a first time-domain resource, a first signal corresponding to the second uplink transmission corresponds to a first resource of the first time-domain resource, a second signal corresponding to the second uplink transmission corresponds to a second resource of the first time-domain resource, and a time length of the second resource is greater than a duration of the second signal.

In some embodiments, the second signal corresponding to the second uplink transmission is before the first signal corresponding to the second uplink transmission, the first signal corresponding to the second uplink transmission belongs to the second uplink transmission, the second signal corresponding to the second uplink transmission belongs to or does not belong to the second uplink transmission.

Reference may be made to the implementations of the steps in FIG. 24 for implementations of the components of the apparatus for receiving uplink transmission shown in FIG. 28, which shall not be described herein any further.

According to the embodiment of this disclosure, a higher transmission efficiency may be obtained.

Fifth Aspect of the Embodiments

The fifth aspect of the embodiments of this disclosure provides a terminal equipment, including the apparatus as described in the third aspect of the embodiments.

FIG. 29 is a schematic diagram of the terminal equipment of the embodiment of this disclosure. As shown in FIG. 29, the terminal equipment 2900 may include a central processing unit 2901 and a memory 2902, the memory 2902 being coupled to the central processing unit 2901. It should be noted that this figure is illustrative only, and other types of structures may also be used, so as to supplement or replace this structure and achieve a telecommunications function or other functions.

In an implementation, the functions of the apparatus described in the third aspect of the embodiments may be integrated into the central processing unit 2901, and the central processing unit 2901 executes the functions of the apparatus described in the third aspect of the embodiments, functions of the apparatus described in the third aspect of the embodiments being incorporated herein, which shall not be described herein any further.

In another implementation, the apparatus described in the third aspect of the embodiments and the central processing unit 2901 may be configured separately; for example, the apparatus described in the third aspect of the embodiments may be configured as a chip connected to the central processing unit 2901, and the functions of the apparatus described in the third aspect of the embodiments are executed under control of the central processing unit 2901.

As shown in FIG. 29, the terminal equipment 2900 may further include a communication module 2903, an input unit 2904, an audio processing unit 2905, a display 2906, and a power supply 2907. It should be noted that the terminal equipment 2900 does not necessarily include all the parts shown in FIG. 29, and the above components are not necessary. Furthermore, the terminal equipment 2900 may include parts not shown in FIG. 29, and the related art may be referred to.

As shown in FIG. 29, the central processing unit 2901 is sometimes referred to as a controller or an operational control, which may include a microprocessor or other processor devices and/or logic devices. The central processing unit 2901 receives input and controls operations of components of the terminal equipment 2900.

The memory 2902 may be, for example, one or more of a buffer memory, a flash memory, a hard drive, a mobile medium, a volatile memory, a nonvolatile memory, or other suitable devices, which may store various data, etc., and furthermore, store programs executing related information. And the central processing unit 2901 may execute programs stored in the memory 2902, so as to realize information storage or processing, etc. Functions of other parts are similar to those of the related art, which shall not be described herein any further. The parts of the terminal equipment 2900 may be realized by specific hardware, firmware, software, or any combination thereof, without departing from the scope of this disclosure.

With the terminal equipment of this embodiment, a higher transmission efficiency may be obtained.

Sixth Aspect of the Embodiments

The sixth aspect of the embodiments of this disclosure provides a network device, such as a gNB (a base station in NR), wherein the network device includes the apparatus as described in the fourth aspect of the embodiments.

Figure 30:
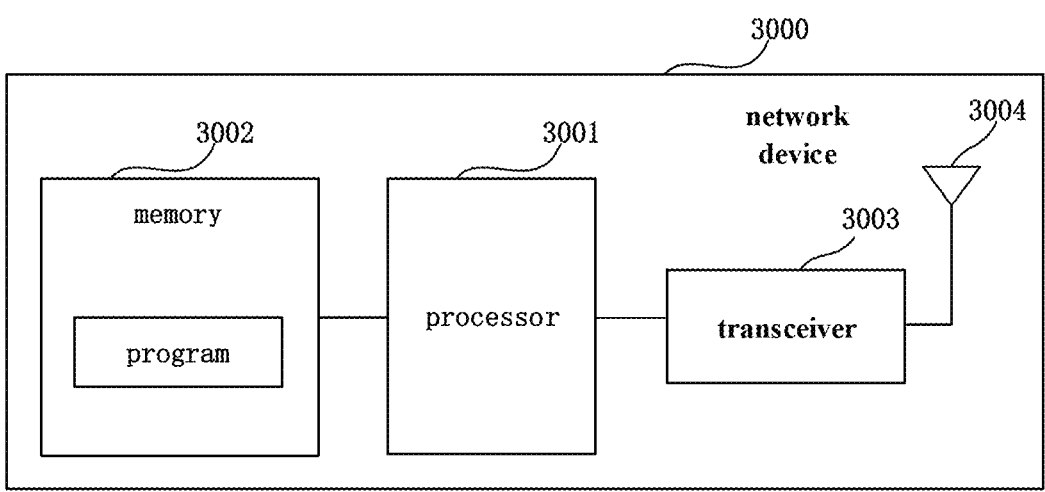
FIG. 30 is a schematic diagram of the network device of a sixth aspect of embodiments.

FIG. 30 is a schematic diagram of the network device of the embodiment of this disclosure. As shown in FIG. 30, the network device 3000 may include a central processing unit (CPU) 3001 and a memory 3002, the memory 3002 being coupled to the central processing unit 3001. The memory 3002 may store various data, and furthermore, it may store a program for data processing, and execute the program under control of the central processing unit 3001, so as to receive various information transmitted by a terminal equipment, and transmit various information to the terminal equipment.

In one implementation, the functions of the apparatus described in the fourth aspect of the embodiments may be integrated into the central processing unit 3001, and the central processing unit 3001 executes the functions of the apparatus described in the fourth aspect of the embodiments, functions of the apparatus described in the fourth aspect of the embodiments being incorporated herein, which shall not be described herein any further.

In another implementation, the apparatus described in the fourth aspect of the embodiments and the central processing unit 3001 may be configured separately; for example, the apparatus described in the fourth aspect of the embodiments may be configured as a chip connected to the central processing unit 3001, and the functions of the apparatus described in the fourth aspect of the embodiments are executed under control of the central processing unit 3001.

Furthermore, as shown in FIG. 30, the network device 3000 may include a transceiver 3003, and an antenna 3004, etc. Functions of the above components are similar to those in the related art, and shall not be described herein any further. It should be noted that the network device 3000 does not necessarily include all the parts shown in FIG. 30. Furthermore, the network device 3000 may include parts not shown in FIG. 30, and the related art may be referred to.

With the network of this embodiment, a higher transmission efficiency may be obtained.

Seventh Aspect of the Embodiments

The seventh aspect of the embodiments of this disclosure provides a communication system, including a network device and a terminal equipment, the network device being, for example, the network device 3000 described in sixth aspect of the embodiments, and the terminal equipment being, for example, the terminal equipment 2900 described in fifth aspect of the embodiments.

In this embodiment, the network device may be, for example, a gNB in NR, and may include conventional compositions and functions of a network device in addition to the functions of the apparatus described in fourth aspect of the embodiments to carry out the method described in the second aspect of the embodiments, which are as described in the sixth aspect of the embodiments, and shall not be described herein any further.

In this embodiment, the terminal equipment is, for example, a UE served by a gNB, and may include conventional compositions and functions of a terminal equipment in addition to the functions of the apparatus described in third aspect of the embodiments to carry out the method described in the first aspect of the embodiments, which are as described in the fifth aspect of the embodiments, and shall not be described herein any further.

With the communication system of this embodiment, a higher transmission efficiency may be obtained.

An embodiment of this disclosure provides a computer readable program, which, when executed in a terminal equipment, will cause a computer to carry out the method described in the first aspect of the embodiments in the terminal equipment.

An embodiment of this disclosure provides a storage medium storing a computer readable program, which will cause a computer to carry out the method described in the first aspect of the embodiments in a terminal equipment.

An embodiment of this disclosure provides a computer readable program, which, when executed in a network device, will cause a computer to carry out the method described in the second aspect of the embodiments in the network device.

An embodiment of this disclosure provides a storage medium storing a computer readable program, which will cause a computer to carry out the method described in the second aspect of the embodiments in a network device.

The above apparatuses and methods of this disclosure may be implemented by hardware, or by hardware in combination with software. This disclosure relates to such a computer-readable program that when the program is executed by a logic device, the logic device is enabled to carry out the apparatus or components as described above, or to carry out the methods or steps as described above. The logic device may be field programmable logic devices, microprocessors, processors used in a computer, etc. This disclosure also relates to a storage medium for storing the above program, such as a hard disk, a floppy disk, a CD, a DVD, and a flash memory, etc.

The methods/apparatuses described with reference to the embodiments of this disclosure may be directly embodied as hardware, software modules executed by a processor, or a combination thereof. For example, one or more functional block diagrams and/or one or more combinations of the functional block diagrams shown in the drawings may either correspond to software modules of procedures of a computer program, or correspond to hardware modules. Such software modules may respectively correspond to the steps shown in the drawings. And the hardware module, for example, may be carried out by firming the soft modules by using a field programmable gate array (FPGA).

The soft modules may be located in a RAM, a flash memory, an ROM, an EPROM, and EEPROM, a register, a hard disc, a floppy disc, a CD-ROM, or any memory medium in other forms known in the art. A memory medium may be coupled to a processor, so that the processor may be able to read information from the memory medium, and write information into the memory medium; or the memory medium may be a component of the processor. The processor and the memory medium may be located in an ASIC. The soft modules may be stored in a memory of a mobile terminal, and may also be stored in a memory card that can be plugged into a mobile terminal. For example, if equipment (such as a mobile terminal) employs a MEGA-SIM card of a relatively large capacity or a flash memory device of a large capacity, the soft modules may be stored in the MEGA-SIM card or the flash memory device of a large capacity.

One or more functional blocks and/or one or more combinations of the functional blocks in the drawings may be realized as a general purpose processor, a digital signal processor (DSP), an application-specific integrated circuit (ASIC), a field programmable gate array (FPGA) or other programmable logic devices, discrete gate or transistor logic devices, discrete hardware component or any appropriate combinations thereof carrying out the functions described in this application. And the one or more functional block diagrams and/or one or more combinations of the functional block diagrams in the drawings may also be realized as a combination of computing equipment, such as a combination of a DSP and a microprocessor, multiple microprocessors, one or more microprocessors in communication combination with a DSP, or any other such configuration.

This disclosure is described above with reference to particular embodiments. However, it should be understood by those skilled in the art that such a description is illustrative only, and not intended to limit the protection scope of this disclosure. Various variants and modifications may be made by those skilled in the art according to the principle of this disclosure, and such variants and modifications fall within the scope of this disclosure.

According to the implementations disclosed in the embodiments, following supplements are further disclosed.

1. A method for transmitting uplink transmission, including:

receiving second indication information by a terminal equipment, the second indication information being used to indicate a duration of a second signal corresponding to a second uplink transmission; and adjusting the duration of the second signal corresponding to the second uplink transmission and transmitting the adjusted second uplink transmission by the terminal equipment.

2. The method according to supplement 1, wherein second signal corresponding to the second uplink transmission overlaps a signal corresponding to the first uplink transmission.

3. The method according to supplement 2, wherein a first signal corresponding to the second uplink transmission does not overlap the signal corresponding to the first uplink transmission.

4. The method according to supplement 1, wherein a gap between the second uplink transmission and the first uplink transmission is smaller than a first predetermined threshold.

5. A method for transmitting uplink transmission, wherein the method includes:

receiving second indication information by a terminal equipment, the second indication information being used to indicate a duration of a second signal corresponding to a second uplink transmission; and transmitting a first uplink transmission or transmitting the second uplink transmission by the terminal equipment, a signal corresponding to the first uplink transmission overlapping the second signal corresponding to the second uplink transmission.

6. The method according to supplement 5, wherein a first signal corresponding to the second uplink transmission does not overlap the signal corresponding to the first uplink transmission.

7. The method according to supplement 5, wherein, if the second signal corresponding to the second uplink transmission overlaps the first uplink transmission, the terminal equipment transmits one of the first uplink transmission and the second uplink transmission.

8. The method according to supplement 2 or 4 or 5, wherein the first uplink transmission and the second uplink transmission are located on the same carrier or on different carriers.

9. The method according to supplement 2 or 4 or 5, wherein the first uplink transmission corresponds to only a first signal, or the first uplink transmission corresponds to a first signal and a second signal.

10. The method according to supplement 2 or 4 or 5, wherein the first uplink transmission and the second uplink transmission are respectively one of the following: a PUSCH, a PUCCH, a PRACH, and an SRS.

11. The method according to supplement 1 or 5, wherein the second signal is CP extension.

12. The method according to supplement 1 or 5, wherein the second uplink transmission corresponds to a first time-domain resource, a first signal corresponding to the second uplink transmission corresponds to a first resource of the first time-domain resource, a second signal corresponding to the second uplink transmission corresponds to a second resource of the first time-domain resource, and a time length of the second resource is greater than a duration of the second signal.

13. The method according to supplement 1 or 5, wherein the second signal corresponding to the second uplink transmission is before the first signal corresponding to the second uplink transmission, the first signal corresponding to the second uplink transmission belongs to the second uplink transmission, and the second signal corresponding to the second uplink transmission belongs to or does not belong to the second uplink transmission.

14. The method according to supplement 2, wherein, if the second signal corresponding to the second uplink transmission overlaps the first uplink transmission, the terminal equipment adjusts the duration of the second signal corresponding to the second uplink transmission, and transmits the second uplink transmission according to the adjusted duration of the second signal.

15. The method according to supplement 2 or 14, wherein that the terminal equipment adjusts the duration of the second signal corresponding to the second uplink transmission includes:

the terminal equipment does not transmit the second signal, or the terminal equipment does not transmit a signal in the second signal overlapping the first uplink transmission, or the terminal equipment does not transmit a signal overlapping the first uplink transmission and a part of a signal not overlapping the first uplink transmission in the second signal.

16. The method according to supplement 4, wherein, if a gap between the second uplink transmission and the first uplink transmission is smaller than the first predefined threshold, the terminal equipment adjusts the duration of the second signal corresponding to the second uplink transmission, and transmits the first uplink transmission and the adjusted second uplink transmission.

17. The method according to supplement 4 or 16, wherein the terminal equipment adjusts the duration of the second signal corresponding to the second uplink transmission to be satisfying a condition as below that:

a gap between the second uplink transmission and the first uplink transmission is 0, or a gap between the second uplink transmission and the first uplink transmission is less than or equal to a second predetermined threshold, the second predetermined threshold being less than the first predetermined threshold.

18. The method according to supplement 1 or 14 or 16, wherein the method further includes:

receiving third indication information by the terminal equipment, the third indication information being used to indicate a duration of a second signal corresponding to the second uplink transmission;

transmitting the second uplink transmission by the terminal equipment according to the duration of the second signal corresponding to the second uplink transmission indicated by the third indication information.

19. The apparatus according to supplement 18, wherein the third indication information is after the second indication information.

20. The apparatus according to supplement 18, wherein the third indication information is carried by physical layer signaling.

21. The apparatus according to supplement 1 or 14 or 16, wherein the terminal equipment adjusts the duration of the second signal corresponding to the second uplink transmission when one or more of the following conditions are satisfied that:

a channel access priority corresponding to the first uplink transmission is lower than or equal to a channel access priority corresponding to the second uplink transmission;

the second uplink transmission is within a channel occupation time (COT) range where the first uplink transmission is in;

the second uplink transmission is within a sub-bandwidth range where the first uplink transmission is in; and a channel detection result corresponding to the first uplink transmission is idle.

22. The apparatus according to supplement 18 or 21, wherein, a gap between a first reference symbol corresponding to the indication information associated with the first uplink transmission and a second reference symbol corresponding to the second uplink transmission is greater than or equal to a first predetermined number (N1) of symbols.

23. The apparatus according to supplement 22, wherein the first reference symbol corresponding to the indication information associated with the first uplink transmission is: a last reference symbol corresponding to the indication information associated with the first uplink transmission.

24. The method according to supplement 23, wherein the indication information associated with the first uplink transmission is: uplink grant DCI.

25. The method according to supplement 22, wherein the second reference symbol corresponding to the second uplink transmission is: a first symbol corresponding to the first signal corresponding to the second uplink transmission, or, a first symbol corresponding to the second signal corresponding to a second uplink transmission.

26. The method according to supplement 21, wherein, a gap between a first reference symbol corresponding to the first uplink transmission and a second reference symbol corresponding to the second uplink transmission is greater than or equal to a second predetermined number (N2) of symbols.

27. The method according to supplement 26, wherein the first reference symbol corresponding to the first uplink transmission is: a first symbol corresponding to the first uplink transmission.

28. The method according to supplement 26, wherein the second reference symbol corresponding to the second uplink transmission is: a first symbol corresponding to the first signal corresponding to the second uplink transmission, or, a first symbol corresponding to the second signal corresponding to the second uplink transmission.

29. The method according to note 18, wherein, a gap between a first reference symbol corresponding to the third indication information and a second reference symbol corresponding to the second uplink transmission is greater than or equal to a third predetermined number (N3) of symbols.

30. The method according to supplement 29, wherein the second reference symbol corresponding to the second uplink transmission is: a first symbol corresponding to the first signal corresponding to the second uplink transmission, or, a first symbol corresponding to the second signal corresponding to the second uplink transmission.

31. The method according to supplement 21, wherein, a gap between a first reference symbol corresponding to indication information used to indicate the COT duration transmitted by the network device and a second reference symbol corresponding to the second uplink transmission is greater than or equal to a fourth predetermined number (N4) of symbols.

32. The method according to supplement 31, wherein the indication information is carried by DCI format 2_0.

33. A method for receiving uplink transmission, wherein the method includes:

transmitting second indication information by a network device, the second indication information being used to indicate a duration of a second signal corresponding to a second uplink transmission of a terminal equipment, the terminal equipment adjusting the duration of the second signal corresponding to the second uplink transmission and transmitting the adjusted second uplink transmission; and receiving the second uplink transmission by the network device.

34. The method according to supplement 33, wherein the second signal corresponding to the second uplink transmission overlaps a signal corresponding to a first uplink transmission.

35. The method according to supplement 33, wherein the second uplink transmission is after the first uplink transmission, and a gap between the second uplink transmission and the first uplink transmission is less than a first predefined threshold.

36. The method according to supplement 33, wherein the method further comprises:

transmitting third indication information by the network device, the third indication information being used to indicate a duration of a second signal corresponding to the second uplink transmission; and the terminal equipment transmits the second uplink transmission according to the duration of the second signal corresponding to the second uplink transmission indicated by the third indication information.

37. A method for receiving uplink transmission, wherein the method includes:

transmitting second indication information by the network device, the second indication information being used to indicate a duration of a second signal corresponding to a second uplink transmission of a terminal equipment, the terminal equipment transmitting first uplink transmission or the second uplink transmission, a signal corresponding to the first uplink transmission overlapping the second signal corresponding to the second uplink transmission; and receiving the first uplink transmission or the second uplink transmission by the network device.

38. The method according to supplement 34 or 35 or 37, wherein the first uplink transmission and the second uplink transmission are located on the same carrier or on different carriers.

39. The method according to supplement 34 or 35 or 37, wherein the first uplink transmission corresponds to only a first signal, or the first uplink transmission corresponds to a first signal and a second signal.

40. The method according to supplement 34 or 35 or 37, wherein the first uplink transmission and the second uplink transmission are respectively one of the following:

A PUSCH, a PUCCH, a PRACH, and an SRS.

41. The method according to supplement 33 or 37, wherein the second signal is CP extension.

42. The method according to supplement 33 or 37, wherein the second uplink transmission corresponds to a first time-domain resource, a first signal corresponding to the second uplink transmission corresponds to a first resource of the first time-domain resource, a second signal corresponding to the second uplink transmission corresponds to a second resource of the first time-domain resource, and a time length of the second resource is greater than a duration of the second signal.

43. The method according to supplement 33 or 37, wherein the second signal corresponding to the second uplink transmission is before the first signal corresponding to the second uplink transmission, the first signal corresponding to the second uplink transmission belongs to the second uplink transmission, and the second signal corresponding to the second uplink transmission belongs to or does not belong to the second uplink transmission.

What is claimed is:

1. An apparatus for transmitting uplink transmission, configured in a terminal equipment, the apparatus comprising:

a receiver configured to receive second indication information, the second indication information being used to indicate a duration of a cyclic prefix (CP) extension corresponding to a second uplink transmission which is after a first uplink transmission, a first one of symbols for the second uplink transmission is next in time to the CP extension corresponding to the second uplink transmission, and the duration of the CP extension being determined, by the terminal equipment, using a length of one or more symbols prior to the first one of symbols for the second uplink transmission, the number of the one or more symbols being indicated by the network device or determined according to timing advance indicated by the network device or determined by the terminal equipment and/or being related to a subcarrier spacing used by the terminal equipment; and processor circuitry configured to transmit the second uplink transmission without applying the CP extension to the second uplink transmission, in response to determining that the CP extension corresponding to the second uplink transmission overlaps the first uplink transmission and a gap between the second uplink transmission and the first uplink transmission is 0 in time-domain.

2. The apparatus according to claim 1, wherein a first signal corresponding to the second uplink transmission does not overlap the first uplink transmission.

3. The apparatus according to claim 1, wherein the first uplink transmission and the second uplink transmission are located on the same carrier or located on different carriers.

4. The apparatus according to claim 1, wherein the first uplink transmission and the second uplink transmission are respectively one of the following: a physical uplink shared channel (PUSCH), a physical uplink control channel (PUCCH), a physical random access channel (PRACH), and a sounding reference signal (SRS).

5. The apparatus according to claim 1, wherein, the receiver further receives third indication information, the third indication information being used to indicate the duration of the CP extension corresponding to the second uplink transmission; and the processor circuitry transmits the second uplink transmission according to the duration of the CP extension corresponding to the second uplink transmission indicated by the third indication information.

6. The apparatus according to claim 5, wherein the third indication information is after the second indication information.

7. The apparatus according to claim 5, wherein the third indication information is carried by physical layer signaling.

8. The apparatus according to claim 1, wherein the processor circuitry adjusts the duration of the CP extension corresponding to the second uplink transmission when one or more of the following conditions are satisfied that:

a channel access priority corresponding to the first uplink transmission is lower than or equal to a channel access priority corresponding to the second uplink transmission;

the second uplink transmission is within a channel occupation time (COT) range where the first uplink transmission is in;

the second uplink transmission is within a sub-bandwidth range where the first uplink transmission is in; and a channel detection result corresponding to the first uplink transmission is idle.

9. The apparatus according to claim 8, wherein, a gap between a first reference symbol corresponding to the first uplink transmission and a second reference symbol corresponding to the second uplink transmission is greater than or equal to a second predetermined number, $N_2$, of symbols.

10. The apparatus according to claim 1, wherein the CP extension corresponding to the second uplink transmission is before a first signal corresponding to the second uplink transmission, the first signal corresponding to the second uplink transmission belongs to the second uplink transmission, and the CP extension corresponding to the second uplink transmission belongs to or does not belong to the second uplink transmission.

11. An apparatus for receiving uplink transmission, configured in a network device, the apparatus comprising:

a transmitter configured to transmit second indication information, the second indication information being used to indicate a duration of a cyclic prefix (CP) extension corresponding to a second uplink transmission which is after a first uplink transmission of a terminal equipment, the terminal equipment transmitting the second uplink transmission without applying the CP extension to the second uplink transmission in response to determining that the CP extension corresponding to the second uplink transmission overlaps the first uplink transmission and a gap between the second uplink transmission and the first uplink transmission is 0 in time-domain, a first one of symbols for the second uplink transmission is next in time to the CP extension corresponding to the second uplink transmission, and the duration of the CP extension being determined, by the terminal equipment, using a length of one or more symbols prior to the first one of symbols for the second uplink transmission, the number of the one or more symbols being indicated by the network device or determined according to timing advance indicated by the network device or determined by the terminal equipment and/or being related to a subcarrier spacing used by the terminal equipment; and a receiver configured to receive the second uplink transmission.

12. The apparatus according to claim 11, wherein, the transmitter further transmits third indication information, the third indication information being used to indicate the duration of the CP extension corresponding to the second uplink transmission, and the terminal equipment transmits the second uplink transmission according to the duration of the CP extension corresponding to the second uplink transmission indicated by the third indication information.

13. The apparatus according to claim 11, wherein the CP extension corresponding to the second uplink transmission is before a first signal corresponding to the second uplink transmission, the first signal corresponding to the second uplink transmission belongs to the second uplink transmission, and the CP extension corresponding to the second uplink transmission belongs to or does not belong to the second uplink transmission.

14. The apparatus according to claim 12, wherein the third indication information is after the second indication information.

15. The apparatus according to claim 1, wherein the second indication information being included in downlink control information (DCI) used for scheduling the second uplink transmission.

\* \* \* \* \*